(12) United States Patent
Cho

(10) Patent No.: US 10,879,535 B2
(45) Date of Patent: Dec. 29, 2020

(54) PRELITHIATED SILICON PARTICLES FOR LITHIUM ION BATTERIES

(71) Applicant: North Carolina Agricultural and Technical State University, Greensboro, NC (US)

(72) Inventor: Sungjin Cho, Greensboro, NC (US)

(73) Assignee: North Carolina Agricultural and Technical State University, Greensboro, NC (US)

(*) Notice: Subject to any disclaimer, the term of this patent is extended or adjusted under 35 U.S.C. 154(b) by 251 days.

(21) Appl. No.: 15/926,529

(22) Filed: Mar. 20, 2018

(65) Prior Publication Data

US 2018/0269483 A1 Sep. 20, 2018

Related U.S. Application Data

(60) Provisional application No. 62/473,772, filed on Mar. 20, 2017.

(51) Int. Cl.
*H01M 4/62* (2006.01)
*H01M 4/36* (2006.01)
(Continued)

(52) U.S. Cl.
CPC ............... *H01M 4/62* (2013.01); *C01B 33/02* (2013.01); *H01M 4/366* (2013.01); *H01M 4/386* (2013.01);
(Continued)

(58) Field of Classification Search
CPC .. C01B 33/02; C01P 2004/61; C01P 2004/64; C01P 2006/40; H01M 10/0525; H01M 2004/027; H01M 4/366; H01M 4/386; H01M 4/483; H01M 4/485; H01M 4/58; H01M 4/587; H01M 4/62; H01M 4/625
See application file for complete search history.

(56) References Cited

U.S. PATENT DOCUMENTS

2009/0305141 A1* 12/2009 Lee .................. H01M 4/02
429/232
2011/0097629 A1* 4/2011 Yew .................. H01M 4/134
429/231.8
2017/0250404 A1 8/2017 Cho

FOREIGN PATENT DOCUMENTS

WO WO 2016/049014 3/2016
WO WO 2019/104193 5/2019

OTHER PUBLICATIONS

Kim, Hye Jin, et al. "Controlled prelithiation of silicon monoxide for high performance lithium-ion rechargeable full cells." Nano letters 16.1 (2015): 282-288.

* cited by examiner

*Primary Examiner* — Lingwen R Zeng
(74) *Attorney, Agent, or Firm* — Jenkins, Wilson, Taylor & Hunt, P.A.

(57) ABSTRACT

A process for the facile prelithiation of silicon-containing materials for use in lithium ion batteries is disclosed. The process can include using a lithium additive comprising LiSt, $Li_2O$—$SiO_2$—$TiO_2$—$P_2O_5$, LATP, LAGP, LLTO, LLZO, $Li_3N$, $LiBF_4$, $Li_2CO_3$, $Li_3PO_4$, lithium-enriched variations thereof, or combinations thereof. The resulting prelithiated materials demonstrate enhanced physicochemical properties providing for high target capacity and excellent cycle stability for the batteries prepared with the materials.

29 Claims, 9 Drawing Sheets

(51) Int. Cl.
*H01M 4/38* (2006.01)
*H01M 10/0525* (2010.01)
*C01B 33/02* (2006.01)
*H01M 4/58* (2010.01)
*H01M 4/587* (2010.01)
*H01M 4/485* (2010.01)
*H01M 4/48* (2010.01)
*H01M 4/02* (2006.01)

(52) U.S. Cl.
CPC ........... *H01M 4/483* (2013.01); *H01M 4/485* (2013.01); *H01M 4/58* (2013.01); *H01M 4/587* (2013.01); *H01M 4/625* (2013.01); *C01P 2004/61* (2013.01); *C01P 2004/64* (2013.01); *C01P 2006/40* (2013.01); *H01M 10/0525* (2013.01); *H01M 2004/027* (2013.01)

PRELITHIATED SILICON PARTICLES FOR LITHIUM ION BATTERIES

RELATED APPLICATIONS

The presently disclosed subject matter claims the benefit of U.S. Provisional Patent Application Ser. No. 62/473,772, filed Mar. 20, 2017; the disclosure of which is incorporated herein by reference in its entirety.

TECHNICAL FIELD

The presently disclosed subject matter relates generally to lithiated silicon-containing materials, anode active materials comprising the lithiated silicon-containing materials, to methods of preparing such materials, and to batteries comprising such materials.

Abbreviations

%=percent or percentage
° C.=degrees Celsius
μl=microliters
μm=micrometers
A=ampere
Ah=ampere-hour
C=coulomb
$cm^{-1}$=reciprocal centimeter
g=gram
LAGP=lithium aluminum germanium phosphate
LATP=lithium aluminum titanium phosphate
Li=lithium
$Li_2CO_3$=lithium carbonate
LiOH=lithium hydroxide
$Li_3PO_4$=lithium phosphate
LiSt=lithium stearate
LLTO=lithium lanthanum titanium oxide
LLZO=lithium lanthanum zirconium oxide
mAh=milliampere-hour
mg=milligram
min=minutes
mm=millimeters
RT=room temperature
SEM=scanning electron microscope
Si=silicon
Si—Fe=silicon iron alloy
SiMP=microparticulate silicon
SiNP=nanoparticulate silicon
SiOx=silicon suboxide (where x<2)
SLMP=stabilized lithium metal powder
V=volts
W=watts
wt=weight
YSZ=yttrium-stabilized zirconium

BACKGROUND

Graphite is currently used as an anode material, but silicon (Si) has attracted great attention because of its natural abundance, lack of toxicity, and high theoretical specific capacity (nearly 4200 mAh $g^{-1}$). Silicon anodes suffer from volume changes of over 300% during lithium insertion/de-insertion cycling and such changes result in pulverization of silicon, unstable solid electrolyte interphase ("SEI") layer, and drastic capacity decay, which limits the use of Si anodes in commercial applications. Eventually, the strain leads to loss of anode particle connectivity and electrode delamination, which affect both battery capacity and cycle life.

The SEI layer provides for the diffusion of lithium ions ($Li^+$) into the electrode (the Si anode) in a lithium-ion battery. The SEI is formed by the reduction of electrolyte on the surface of the electrode, a process by which $L^+$ ions are permanently consumed and are not available for insertion/de-insertion cycling. Silicon electrodes typically have low initial columbic efficiency because large amounts of $Li^+$ incorporate into the SEI layer during the initial charge/discharge cycle. Further, during the volume changes caused by repeated cycling, the Si pulverizes, exposing new surfaces, which are then coated with a newly formed SEI layer, further consuming $L^+$ and leading to irreversible capacity loss. In this manner, the SEI layer grows ever thicker, reducing the number of available $Li^+$, and resulting in capacity fading and poor cycle life.

Thus, there remains a need for improved approaches for the preparation of a silicon-containing electrode. For example, there is a need for a silicon-containing electrode that can readily incorporate lithium ions before battery cycling.

SUMMARY

It is an object of the presently disclosed subject matter to provide prelithiated silicon particles and anode active materials comprising the prelithiated silicon particles, as well as methods of preparing such prelithiated silicon particles and batteries containing such prelithiated silicon particles.

The presently disclosed subject matter provides a prelithiated silicon-containing material comprising: (a) a silicon core particle comprising a silicon-containing material selected from the group consisting of: (i) a silicon alloy, wherein the silicon alloy is selected from the group consisting of a silicon iron (SiFe) alloy and an alloy comprising silicon, iron and another element X, wherein X is selected from the group consisting of Mn, Cr, Sn, Ti, Ni, Co, Mo, Zr, Cu, and Al; (ii) nanoparticulate silicon (SiNP) and/or microparticulate silicon (SiMP); and (iii) a silicon suboxide ($SiO_x$); and (b) a lithium coating layer comprising a lithium additive, wherein the lithium coating layer covers at least a portion of the silicon core particle, optionally wherein the lithium additive comprises one or more of the group consisting of lithium stearate (LiSt), lithium oxide-silicon oxide-titanium oxide-phosphorus pentoxide ($Li_2O$—$SiO_2$—$TiO_2$—$P_2O_5$), lithium aluminum titanium phosphate (LATP), lithium aluminum germanium phosphate (LAGP), lithium lanthanum titanium oxide (LLTO), lithium lanthanum zirconium oxide (LLZO), lithium nitride ($Li_3N$), lithium tetrafluoroborate ($LiBF_4$), lithium carbonate ($Li_2CO_3$), lithium phosphate ($Li_3PO_4$), lithium-enriched variations thereof, and combinations thereof.

The presently disclosed subject matter also provides a process for the preparation of a prelithiated silicon-containing material described above, wherein the process comprises: providing a silicon core particle as disclosed above; and milling the silicon core particle with one or more lithium additives as disclosed above to provide a lithium-coated particle.

The presently disclosed subject matter further provides an anode active material comprising a plurality of prelithiated silicon-containing particles, which individually can be the same or different, wherein each of the plurality of prelithiated silicon-containing particles comprises: (a) a silicon core particle comprising a silicon-containing material as disclosed above; and (b) a lithium coating layer comprising a lithium additive as disclosed above.

The presently disclosed subject matter additionally provides a battery comprising: a negative electrode comprising the anode active material disclosed herein; a positive electrode; and an electrolyte.

An object of the presently disclosed subject matter having been stated hereinabove, and which is achieved in whole or in part by the presently disclosed subject matter, other objects will become evident as the description proceeds when taken in connection with the accompanying drawings as best described hereinbelow.

DETAILED DESCRIPTION

Figure 1A:
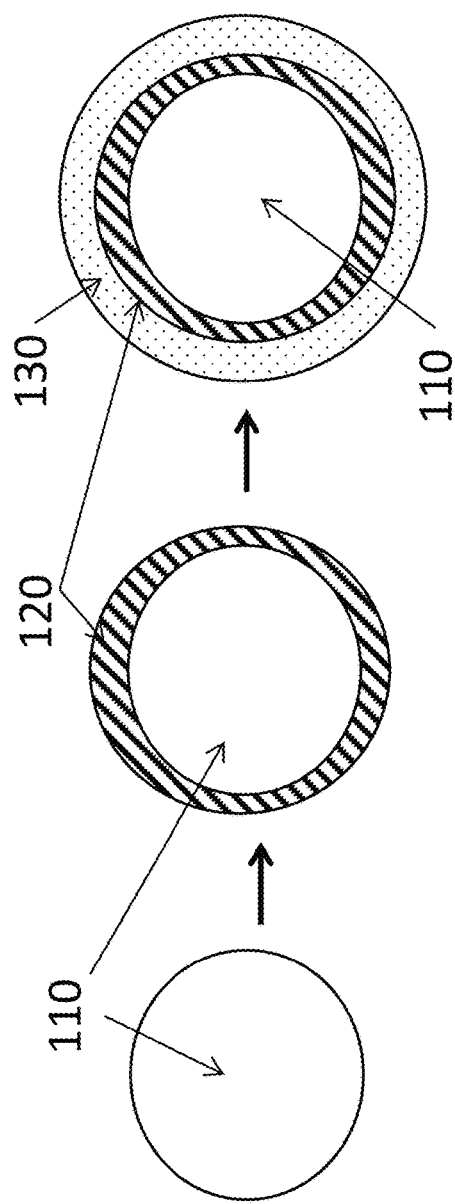
FIG. 1A is schematic drawing showing an exemplary method of preparing an anode active material of the presently disclosed subject matter wherein silicon-containing material 110 (e.g., a silicon nanoparticle) is coated with a lithium additive 120 and then coated with a carbon-containing material 130.

The presently disclosed subject matter will now be described more fully. The presently disclosed subject matter can, however, be embodied in different forms and should not be construed as limited to the embodiments set forth herein below and in the accompanying Examples. Rather, these embodiments are provided so that this disclosure will be thorough and complete, and will fully convey the scope of the embodiments to those skilled in the art.

All references listed herein, including but not limited to all patents, patent applications and publications thereof, and scientific journal articles, are incorporated herein by reference in their entireties to the extent that they supplement, explain, provide a background for, or teach methodology, techniques, and/or compositions employed herein.

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs.

Following long-standing patent law convention, the terms "a", "an", and "the" refer to "one or more" when used in this application, including the claims.

The term "and/or" when used in describing two or more items or conditions, refers to situations where all named items or conditions are present or applicable, or to situations wherein only one (or less than all) of the items or conditions is present or applicable.

The use of the term "or" in the claims is used to mean "and/or" unless explicitly indicated to refer to alternatives only or the alternatives are mutually exclusive, although the disclosure supports a definition that refers to only alternatives and "and/or."

As used herein "another" can mean at least a second or more.

The term "comprising", which is synonymous with "including," "containing," or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially_affect the basic and novel characteristic(s) of the claimed subject matter.

Unless otherwise indicated, all numbers expressing quantities of size, capacity, percentage (%), and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about", when referring to a value is meant to encompass variations of in one example ±20% or ±10%, in another example ±5%, in another example ±1%, and in still another example ±0.1% from the specified amount, as such variations are appropriate to perform the disclosed methods.

As used herein, a "lithium additive" refers to a lithium-containing material including, but not limited to lithium stearate (LiSt), lithium oxide-silicon oxide-titanium oxide-phosphorous pentoxide ($Li_2O$—$SiO_2$—$TiO_2$—$P_2O_5$), $Li_3N$ (lithium nitride), $LiBF_4$ (lithium tetrafluoroborate), $Li_2CO_3$ (lithium carbonate), $Li_3PO_4$ (lithium phosphate), $Li_{1.3}Al_{0.3}Ti_{1.7}(PO_4)_3$ (lithium aluminum titanium phosphate, hereafter denoted 'LATP'), $Li_{0.35}Al_{0.5}Ge_{1.5}(PO_4)_3$ (lithium aluminum germanium phosphate, hereafter denoted 'LAGP'), $Li_{0.34}La_{0.56}TiO_3$ (lithium lanthanum titanium oxide, hereafter denoted 'LLTO'), and $Li_7La_3Zr_2O_{12}$ (lithium lanthanum zirconium oxide, hereafter denoted 'LLZO'). Lithium additives can be used in combination with one another.

As used herein "lithium-enriched" refers to a lithium additive containing at least about 1 wt % excess $L^+$ compared to the typical stoichiometry for the lithium additive. Some standard manufacturing processes of lithium additives yield lithium-deficient materials, i.e. material having less lithium than designated in the chemical formula. In contrast, as disclosed herein, lithium additives are prepared via reaction mixtures using more than the stoichiometric amounts of lithium and yield lithium additives containing at least the stoichiometric amount of lithium and in some examples, containing more that the stoichiometric amount of lithium, i.e. excess lithium, or lithium-enriched additives. In some embodiments, lithium-enriched additives include, but are not limited to $Li_{2+x}O$—$SiO_2$—$TiO_2$—$P_2O_5$ (i.e., lithium-enriched $Li_2O$—$SiO_2$—$TiO_2$—$P_2O_5$), $Li_{3+x}N$ (i.e., lithium-enriched $Li_3N$), $Li_{1+x}BF_4$ (i.e., lithium-enriched $LiBF_4$), $Li_{2+x}CO_3$ (i.e., lithium-enriched $Li_2CO_3$), $Li_{3+x}PO_4$ (i.e., lithium-enriched $Li_3PO_4$), $Li_{1.3+x}Al_{0.3}Ti_{1.7}(PO_4)_3$ (i.e., lithium-enriched LATP), $Li_{0.35+x}Al_{0.5}Ge_{1.5}(PO_4)_3$ (i.e., lithium-enriched LAGP), $Li_{0.34+x}La_{0.56}TiO_3$ (i.e., lithium-enriched LLTO), and $Li_{7+x}La_3Zr_2O_{12}$ (i.e., lithium-enriched LLZO). Generally, x can be greater than 0.001; alternately, x can be greater than 0.01. In one variation, the lithium-enriched additive is prepared from a reaction mixture containing at least about 10 wt % excess of a lithium source, at least about 20 wt % excess, at least about 30 wt % excess, at least about 40 wt % excess, at least about 50 wt % excess, at least about 60 wt % excess, at least about 70 wt % excess, at least about 80 wt % excess, at least about 90 wt % excess, or even at least about 100 wt % excess of a lithium source. Such reaction mixtures yield lithium-enriched additives containing at least about 1 wt % excess of lithium relative to defined chemical formula for lithium additives. In some embodiments, the lithium additive is a lithium-enriched additive comprising one or more of the group consisting of lithium-enriched $Li_2O$—$SiO_2$—$TiO_2$—$P_2O_5$, lithium-enriched $Li_2CO_3$, lithium-enriched $Li_3N$, lithium-enriched $LiBF_4$, lithium-enriched $Li_3PO_4$, lithium-enriched LATP, lithium-enriched LAGP, lithium-enriched LLTO, lithium-enriched LLZO and combinations thereof. In other embodiments, lithium-enriched additives can include lithium enriched $Li_2O$—$SiO_2$—$TiO_2$—$P_2O_5$, lithium-enriched LATP, lithium-enriched LAGP, lithium-enriched LLTO, lithium-enriched LLZO and combinations thereof. In still other embodiments, lithium-enriched additives can include lithium-enriched $Li_3N$, lithium-enriched $LiBF_4$, lithium-enriched $Li_2CO_3$, lithium-enriched $Li_3PO_4$ and combinations thereof. Alternately, lithium-enriched additives can include lithium-enriched $Li_3N$, lithium-enriched $LiBF_4$, lithium-enriched $Li_3PO_4$ and combinations thereof.

As used herein, "lithium-containing solid electrolytes" generally refer to lithium additives known to transport $L^+$ ions, and include but are not limited to $Li_{2+x}O$—$SiO_2$—$TiO_2$—$P_2O_5$, LATP, LAGP, LLZO, LLTO, $Li_3N$, $LiBF_4$, and $Li_3PO_4$. Solid electrolytes can improve particle-level ionic conductivity. As disclosed herein, lithium-containing solid electrolytes can be lithium-enriched.

The term "particle" as in "silicon-containing particle" as used herein refers to a three-dimensional structure having at least one region with a dimension (e.g., a length, width, diameter, etc.) of less than about 1 millimeter (mm). Typically, a particle is less than 0.5 mm, or even less than 0.2 mm. Thus, in some embodiments, the particle is a "microparticle" or a "nanoparticle."

In some embodiments, the particle is approximately spherical. When the particle is approximately spherical, the characteristic dimension can correspond to the diameter of the sphere. In addition to spherical shapes, the particle can be disc-shaped, plate-shaped (e.g., hexagonally plate-like), polyhedral, cubic, or irregularly-shaped. In some embodiments, the particle is other than rod-shaped or wire-shaped, e.g. is not a nanowire.

The term "microparticle" refers to a structure having at least one region with a dimension (e.g., a length, width, diameter, etc.) of less than about 1 mm (i.e., 1,000 micrometers (μm)) and more than about 1 μm. In some embodiments, the dimension is less than about 900, 800, 700, or 600 μm. In some embodiments, the dimension is smaller (e.g., less than about 500 μm, less than about 400 μm, less than about 300 μm, less than about 250 μm, less than about 200 μm, less than about 150 μm, less than about 125 μm, less than about 100 μm, less than about 80 μm, less than about 70 m, less than about 50 μm, less than about 50 μm, less than about 40 μm, less than about 30 μm, less than about 25 μm, or less than about 20 μm). In some embodiments, the dimension is between about 1 μm and about 100 μm. In some embodiments, the dimension is between about 1 μm and about 10 μm (e.g., about 1, 1.5, 2, 2.5, 3, 3.5, 4, 4.5, 5, 6, 7, 8, 9, or 10 μm).

As disclosed herein, microparticulate silicon ("SiMP") typically has an average particle size between about 1 μm and about 500 μm. For example, the particle size can be between about 1 μm and about 250 μm, or between about 1 μm and about 100 μm, or between about 1 μm and about 50 μm, or between about 1 μm and about 25 μm, or between about 1 μm and about 20 μm, or between about 1 μm and about 15 μm, or between about 1 μm and about 10 μm, or between about 1 μm and about 5 μm. Generally microparticulate silicon has an average particle size less than about 100 μm, such as between about 10 μm and about 40 μm or between about 20 μm and about 30 μm.

The term "nanoparticle" refers to a structure having at least one region with a dimension (e.g., length, width, diameter, etc.) of less than about 1,000 nm. In some embodiments, the dimension is smaller (e.g., less than about 500 nm, less than about 250 nm, less than about 200 nm, less than about 150 nm, less than about 125 nm, less than about 100 nm, less than about 80 nm, less than about 70 nm, less than about 60 nm, less than about 50 nm, less than about 40 nm, less than about 30 nm or even less than about 20 nm). In some embodiments, the dimension is between about 20 nm and about 250 nm (e.g., about 20, 30, 40, 50, 60, 70, 80, 90, 100, 110, 120, 130, 140, 150, 160, 170, 180, 190, 200, 210, 220, 230, 240, or 250 nm).

In one embodiment, nanoparticulate silicon ("SiNP") has an average particle size less than about 900 nm. Alternately SiNP has an average particle size less than about 750 nm, less than about 500 nm, or less than about 250 nm. In another embodiment, SiNP has an average particle size between about 10 nm and about 900 nm, between about 50 nm and about 500 nm, or between about 25 nm and about 250 nm.

In one embodiment, the silicon alloy, e.g. SiFe or SiFeX, where X is Mn, Cr, Sn, Ti, Ni, Co, Mo, Zr, Cu, or Al, is a microparticle and has an average particle size between about 1 μm and about 500 μm. For example, the particle size can be between about 1 μm and about 250 μm, or between about 1 μm and about 100 μm, or between about 1 μm and about 50 μm, or between about 1 μm and about 25 μm, or between about 1 μm and about 20 μm, or between about 1 μm and about 15 μm, or between about 1 μm and about 10 μm, or between about 1 μm and about 5 μm. Alternately, the silicon alloy is a nanoparticle and has an average particle size less than about 900 nm, less than about 750 nm, less than about 500 nm, less than about 250 nm, less than about 100 nm, or less than about 50 nm.

As used herein "$SiO_x$" generally refers to silicon suboxide particles (wherein x<2) having a variety of different oxygen content and different particle sizes, for example 50 nm-20 μm. Examples of $SiO_x$ include, but are not limited to $SiO_{0.8}$ (average particle size 50 nm), SiO (average particle size 2000 nm), $SiO_{1.1}$ (average particle size 30 nm) and $SiO_{1.1}$ (average particle size 50 nm). In some embodiments, $SiO_x$ can have an average particle size between about 1 μm and about 500 μm. For example, the particle size can be between about 1 μm and about 250 μm, or between about 1 μm and about 100 μm, or between about 1 μm and about 50 μm, or between about 1 μm and about 25 μm, or between about 1 μm and about 20 μm, or between about 1 μm and about 15 μm, or between about 1 μm and about 10 μm, or between about 1 μm and about 5 μm. Alternately, $SiO_x$ has an average particle size less than about 900 nm, less than about 750 nm, less than about 500 nm, less than about 250 nm, less than about 100 nm, or less than about 50 nm.

The particle (e.g., the silicon core particle of a material as disclosed herein) can comprise a core region (i.e., the space between the outer dimensions of the particle) and an outer surface (i.e., the surface that defines the outer dimensions of the particle). In some embodiments, the particle can have one or more surface defects, e.g., cracks, voids, indentations or protrusions. In some embodiments, the particle can have one or more coating layers surrounding or partially surrounding the particle core. Thus, for example, a spherical particle can have one or more concentric coating layers, each successive layer being dispersed over the outer surface of a smaller layer closer to the center of the particle.

The terms "coating" and "coating layer" as used herein refer to a layer that covers at least a portion of the surface of a particle. The coating layer can cover the surface directly or indirectly (e.g., another coating layer or layers can be situated between the subject coating layer and the surface of the core particle). Thus, in some embodiments, the coating is in direct contact with the surface of the particle. In some embodiments, the coating layer is not in direct contact with the surface of the particle. In some embodiments, the coating layer can cover a plurality of non-adjacent areas of the surface of the particle. Typically, the coating layer has a thickness that is less than about half of the diameter or average diameter of the particle. In one embodiment the coating is distributed into the defects, e.g. cracks, voids or indentations, of the particle surface; such defects can be partially or fully filled by a coating layer depending on the degree of coating.

In some embodiments, a coating covers up to about 10% of the surface of the particle or the coated particle. In other embodiments, a coating covers up to about 20%, up to about 30%, up to about 40%, up to about 50%, up to about 60%, up to about 70%, up to about 80%, up to about 90%, or up to about 100% of the surface of the particle or the coated particle. In other embodiments, a coating covers no more than about 10% of the surface of the particle or the coated particle. In still other embodiments, a coating covers no more than about 20%, no more than about 30%, no more than about 40%, no more than about 50%, no more than about 60%, no more than about 70%, no more than about 80%, no more than about 90%, or about 100% of the surface of the particle or the coated particle.

As used herein, "coating" as in "carbon coating" refers to a coating comprising a carbon-containing material. Typically, a carbon coating is applied to a silicon core particle or to a prelithiated silicon particle. In some embodiments, a carbon coating can be applied by milling a silicon core particle or a prelithiated silicon particle with a carbon-containing material. The carbon-containing material can include, but is not limited to, activated carbon, artificial graphite, natural graphite, carbon nanotubes (CNT), graphene, other carbon rich sources, and combinations thereof. In one embodiment of any aspect disclosed herein, the carbon-containing material comprises activated carbon, artificial graphite, natural graphite, carbon nanotubes, graphene, or combinations thereof. In another embodiment, the carbon-containing material comprises activated carbon, artificial graphite, natural graphite, carbon nanotubes, graphene, or combinations thereof. In another variation, the carbon-containing material comprises activated carbon, artificial graphite, natural graphite, or combinations thereof. In yet another variation, the carbon-containing material comprises graphite.

As used herein "coating" as in "lithium coating" refers to a coating comprising a lithium additive. Typically a lithium coating is applied to a silicon core particle or to a carbon-coated silicon particle. In some embodiments, a lithium coating can be applied by milling a silicon core particle or a carbon-coated silicon particle with a lithium additive, which can include, but is not limited to LiSt, $Li_2O$—$SiO_2$—$TiO_2$—$P_2O_5$, $Li_3N$, $LiBF_4$, $Li_2CO_3$, $Li_3PO_4$, LATP, LAGP, LLTO, LLZO, lithium-enriched variations thereof and combinations thereof as disclosed herein.

As used herein, "heat treatment" generally refers to heating a reaction mixture. Typically heat treatment refers to heating a reaction mixture comprising a silicon-containing material and a lithium additive at the melting point of the lithium additive or heating the mixture at a temperature up to 100° C. above the melting point of the lithium additive. Generally as disclosed herein, heat treatment is used in combination with milling.

As used herein, "milling" or "mechanical milling" includes air jet milling and ball milling, both of which are methods well-known to those of skill in the art for the combination of particulates, such as powders. Generally, reference is made herein to ball milling, but the step of ball milling can be substituted with air jet milling to achieve the same results. Additionally, air jet milling is commonly used to separate prepared powders to make them more easily flowable; alternately, sieving product powders makes them more easily flowable.

In one aspect, the presently disclosed subject matter provides a particulate silicon-containing material that has been coated with a lithium additive to enhance its ionic conductive properties; in one embodiment the lithium additive is a lithium-enriched additive. In one embodiment, the prelithiated silicon particle has increased particle strength and hardness compared to the unlithiated silicon-containing particle. A prelithiated silicon particle can be further coated with a carbon-containing material, yielding enhanced electronic conductive properties. The resulting materials can be used to prepare an electrode having high-energy capacity and excellent cycle stability.

In one embodiment, the silicon-containing particle is milled with a lithium additive. In one variation, the lithium additive is a lithium-enriched additive. Milling with a lithium additive generally incorporates the lithium additive into the cracks and voids of the silicon-containing particle; such defects can be partially or fully filled by the lithium additive, depending on the degree of coating. The prelithiated silicon-containing particle can be further coated with a carbon-containing material disclosed herein via milling.

In another variation, the silicon-containing particle is milled with a carbon-containing material. In one variation, the carbon-coated silicon particle is milled with a lithium additive to prelithiate the coated silicon particle. In one variation, the lithium additive is a lithium-enriched additive. Milling with a carbon-containing material generally incorporates the carbon-containing material into the cracks and voids of the silicon-containing particle; such defects can be partially or fully filled by the carbon-containing material, depending on the degree of coating. The carbon-coated silicon particle can be further coated with a lithium additive disclosed herein via milling.

In one aspect, the presently disclosed subject matter provides a process for the preparation of a prelithiated silicon-containing material, wherein the process comprises: providing a silicon core particle comprising a silicon-containing material selected from the group consisting of: (i) a silicon alloy, wherein the silicon alloy is selected from the group consisting of a silicon iron (SiFe) alloy and an alloy comprising silicon, iron and another element X, wherein X is selected from the group consisting of Mn, Cr, Sn, Ti, Ni, Co, Mo, Zr, Cu, and Al; (ii) nanoparticulate silicon (SiNP) and/or microparticulate silicon (SiMP); and (iii) a silicon suboxide ($SiO_x$); and milling the silicon core particle with one or more lithium additives, optionally selected from the group consisting of lithium stearate (LiSt), lithium oxide-silicon oxide-titanium oxide-phosphorus pentoxide ($Li_2O$—$SiO_2$—$TiO_2$—$P_2O_5$), lithium aluminum titanium phosphate (LATP), lithium aluminum germanium phosphate (LAGP), lithium lanthanum titanium oxide (LLTO), lithium lanthanum zirconium oxide (LLZO), lithium nitride ($Li_3N$), lithium tetrafluoroborate ($LiBF_4$), lithium carbonate ($Li_2CO_3$), lithium phosphate $Li_3PO_4$, lithium-enriched variations thereof, and combinations thereof to provide a lithium-coated particle. In one embodiment, the method further comprises milling the lithium-coated particle with a carbon-containing material.

In one embodiment, each of the silicon core particle, the carbon-containing material, and the lithium additive is a powder and the powders are combined using manual grinding or milling, including, but not limited to air jet milling or ball milling. Generally, when the lithium additive has a high melting point (>400° C.), it is combined with a silicon core particle using grinding or milling. Generally, when the lithium additive has a low melting point (<400° C.), it is combined with a silicon core particle, optionally coated with a carbon-containing material, using heat treatment in combination with grinding or milling. In one variation, heat treatment is used in combination with ball-milling. Generally, the heat treatment does not alter the crystal structure of the silicon core particle.

In one aspect, the presently disclosed subject matter provides a prelithiated silicon-containing material comprising: (a) a silicon core particle comprising a silicon-containing material selected from the group consisting of: (i) a silicon alloy, wherein the silicon alloy is selected from the group consisting of a silicon iron (SiFe) alloy and an alloy comprising silicon, iron and another element X, wherein X is selected from the group consisting of Mn, Cr, Sn, Ti, Ni, Co, Mo, Zr, Cu, and Al; (ii) nanoparticulate silicon (SiNP) and/or microparticulate silicon (SiMP); and (iii) a silicon suboxide ($SiO_x$); and (b) a lithium coating layer comprising a lithium additive, wherein the lithium coating layer covers at least a portion of the silicon core particle and optionally the lithium additive comprises one or more of the group consisting of lithium stearate (LiSt), lithium oxide-silicon oxide-titanium oxide-phosphorus pentoxide ($Li_2O$—$SiO_2$—$TiO_2$—$P_2O_5$), lithium aluminum titanium phosphate (LATP), lithium aluminum germanium phosphate (LAGP), lithium lanthanum titanium oxide (LLTO), lithium lanthanum zirconium oxide (LLZO), lithium nitride ($Li_3N$), lithium tetrafluoroborate ($LiBF_4$), lithium carbonate ($Li_2CO_3$), lithium phosphate ($Li_3PO_4$), lithium-enriched variations thereof, and combinations thereof.

In one embodiment, the prelithiated silicon-containing material further comprises a carbon coating layer, wherein the carbon coating layer comprises a carbon-containing material. In one variation, the carbon-containing material is selected from the group consisting of activated carbon, artificial graphite, natural graphite, carbon nanotubes, graphene, and combinations thereof.

In one variation of any embodiment or aspect disclosed herein, the lithium coating layer directly coats at least a portion of the surface of the silicon core particle and the carbon coating layer coats at least a portion of the surface of the lithium coating layer. In another variation, the carbon coating layer directly coats at least a portion of the surface of the silicon core particle and the lithium coating layer coats at least a portion of the surface of the carbon coating layer.

In one embodiment, the silicon core particle comprises SiNP and/or SiMP. In one variation, the silicon core particle comprises SiNP; alternately, the silicon core particle comprises SiMP. In yet another variation, the silicon core particle is SiNP; alternately the silicon core particle is SiMP.

In another embodiment, the silicon core particle comprises a silicon alloy selected from the group consisting of a SiFe alloy and an alloy comprising silicon, iron and another element X (i.e., a SiFeX alloy), wherein X is selected from the group consisting of Mn, Cr, Sn, Ti, Ni, Co, Mo, Zr, Cu, and Al. In another embodiment, the silicon alloy is selected from the group consisting of a silicon iron (SiFe) alloy and an alloy comprising silicon, iron and another element X, wherein X is selected from the group consisting of Mn, Cr, Ni, Co, Zr, and Al. In yet another embodiment, the silicon alloy is a silicon iron (SiFe) alloy or an alloy comprising silicon, iron and manganese (Mn). In a further embodiment, the silicon alloy is an SiFe alloy; alternately, the silicon alloy is an SiFeMn alloy.

In one variation of any embodiment or aspect disclosed herein, the lithium additive comprises one or more of the group consisting of $Li_2O$—$SiO_2$—$TiO_2$—$P_2O_5$, LATP, LAGP, LLTO, LLZO, $Li_3N$, $LiBF_4$, $LiPO_4$, lithium-enriched variations thereof, and combinations thereof. In another variation of any embodiment or aspect disclosed herein, the lithium additive is a lithium-enriched additive comprising one or more of the group consisting of lithium-enriched $Li_2O$—$SiO_2$—$TiO_2$—$P_2O_5$, lithium-enriched LATP, lithium-enriched LAGP, lithium-enriched LLTO, lithium-enriched LLZO, lithium-enriched $Li_3N$, lithium-enriched $LiBF_4$, lithium-enriched $LiPO_4$, and combinations thereof. In another variation, the lithium additive comprises one or more of the group consisting of a lithium-enriched $Li_2O$—$SiO_2$—$TiO_2$—$P_2O_5$, a lithium-enriched LATP, a lithium-enriched LAGP, a lithium-enriched LLTO, and a lithium-enriched LLZO.

In another variation of any embodiment or aspect, the particulate prelithiated silicon-containing material comprises between about 0.1 wt % and about 99.9 wt % lithium additive and between about 99.9 wt % and about 0.1 wt % silicon-containing core. Alternately, the particulate prelithiated silicon-containing material comprises between about 0.1 wt % and about 25 wt % lithium additive, or between about 1 wt % and about 20 wt %, or between about 2 wt % and about 17.5 wt %, or between about 5 wt % and about 15 wt % lithium additive. Alternately, the particulate prelithiated silicon-containing material comprises at least about 0.1 wt % lithium additive, at least about 1 wt % lithium additive, at least about 5 wt % lithium additive, at least about 10 wt % lithium additive, at least about 15 wt % lithium additive, at least about 20 wt % lithium additive, at least about 25 wt % lithium additive, or at least about 50 wt % lithium additive.

In another embodiment, the particulate prelithiated silicon-containing material further comprises a carbon-containing coating. In one variation, the silicon-containing core comprises between about 50 wt % and about 98 wt %; the lithium additive comprises between about 1 wt % and about 30 wt %; and the carbon-containing material comprises between about 1 wt % and about 20 wt % of the particulate prelithiated silicon-containing material. In another variation, the silicon-containing core comprises between about 60 wt % and about 95 wt %; the lithium additive comprises between about 2.5 wt % and about 25 wt %; and the carbon-containing material comprises between about 2.5 wt % and about 15 wt %. In yet another variation, the silicon-containing core comprises between about 75 wt % and about 90 wt %; the lithium additive comprises between about 5 wt % and about 15 wt %; and the carbon-containing material comprises between about 5 wt % and about 10 wt %

In one variation, a silicon core particle, comprising SiNP or SiMP is coated with a lithium additive, optionally a lithium-enriched additive, and that prelithiated silicon particle is coated with a carbon-containing material. See FIG. 1A. In a representative, non-limiting embodiment shown in FIG. 1A, silicon-containing material 110 (e.g., a silicon nanoparticle) is coated with a lithium additive 120 and then coated with a carbon-containing material 130. In another variation, a silicon core particle is first coated with a carbon-containing material and then coated with a lithium additive, optionally a lithium-enriched additive. In one variation the silicon core particle is SiNP. In another variation, the silicon core particle is SiMP.

In another variation, a silicon core particle comprising $SiO_x$ is coated with a lithium additive, optionally a lithium-enriched additive, and the prelithiated silicon particle is coated with a carbon-containing material. In another variation, a silicon core particle comprising $SiO_x$ is first coated with a carbon-containing material and then coated with a lithium additive, optionally a lithium-enriched additive. In another variation, the silicon core particle is SiOx.

In yet another variation, a silicon core particle comprising a silicon alloy, SiFe or SiFeMn, is coated with a lithium additive, optionally a lithium-enriched additive, and the prelithiated silicon core particle is coated with a carbon-containing material. In another variation, a silicon core particle comprising a silicon alloy, SiFe or SiFeMn, is first coated with a carbon-containing material, and is then coated with a lithium additive, optionally a lithium-enriched additive. In one variation, the silicon core particle is SiFe; in another variation, the silicon core particle is SiFeMn.

In another aspect, the presently disclosed subject matter provides an anode active material comprising a plurality of prelithiated silicon-containing particles, which individually can be the same or different, wherein each of the plurality of prelithiated silicon-containing particles comprises: (a) a silicon core particle comprising a silicon-containing material selected from the group consisting of: (i) a silicon alloy, wherein the silicon alloy is selected from the group consisting of a silicon iron (SiFe) alloy and an alloy comprising silicon, iron and another element X, wherein X is selected from the group consisting of Mn, Cr, Sn, Ti, Ni, Co, Mo, Zr, Cu, and Al; (ii) nanoparticulate silicon (SiNP) and/or microparticulate silicon (SiMP); and (iii) a silicon suboxide ($SiO_x$); and (b) a lithium coating layer comprising a lithium additive, optionally wherein the lithium additive comprises one or more of the group consisting of lithium stearate (LiSt), lithium oxide-silicon oxide-titanium oxide-phosphorus pentoxide ($Li_2O$—$SiO_2$—$TiO_2$—$P_2O_5$), lithium aluminum titanium phosphate (LATP), lithium aluminum germanium phosphate (LAGP), lithium lanthanum titanium oxide (LLTO), lithium lanthanum zirconium oxide (LLZO), lithium nitride ($Li_3N$), lithium tetrafluoroborate ($LiBF_4$), lithium carbonate ($Li_2CO_3$), lithium phosphate $Li_3PO_4$, lithium-enriched variations thereof, and combinations thereof.

In one embodiment, one or more of the plurality of prelithiated silicon-containing particles of the anode active material further comprises (c) a carbon coating layer, optionally wherein the carbon coating layer comprises a carbon-containing material selected from the group consisting of activated carbon, artificial graphite, natural graphite, carbon nanotubes, graphene, and combinations thereof.

In one embodiment, one or more of the plurality of prelithiated silicon-containing particles comprises a silicon core particle comprising SiNP and/or SiMP. In one variation, the plurality of particles comprise particles where the silicon core particles comprise SiNP and particles where the silicon core particles comprise SiMP. In another variation, the plurality of particles comprise particles where the silicon core particles are SiNP and particles where the silicon core particles are SiMP. In another variation, the plurality of particles comprise about a 10:90 ratio of particles where the silicon core particles comprise SiNP and particles where the silicon core particles comprise SiMP. Alternately, the ratio is about 20:80, or about 30:70, or about 40:60, or about 50:50, or about 60:40, or about 70:30, or about 80:20, or about 90:10.

In another embodiment, one or more of the plurality of prelithiated silicon-containing particles comprises a silicon core particle comprising a silicon alloy selected from a SiFe alloy or an alloy comprising silicon, iron, and another element X, wherein X is selected from the group consisting of Mn, Cr, Sn, Ti, Ni, Co, Mo, Zr, Cu, and Al. In yet another embodiment, the silicon alloy is selected from the group consisting of a silicon iron (SiFe) alloy and an alloy comprising silicon, iron and another element X, wherein X is selected from the group consisting of Mn, Cr, Ni, Co, Zr, and Al. In yet another embodiment, the silicon alloy is SiFe. In yet another embodiment, the silicon alloy is SiFeMn.

In yet another embodiment, the plurality of prelithiated silicon-containing particles comprise particles wherein the silicon core particles comprise SiNP and/or SiMP and particles wherein the silicon core particles comprise SiOx. In one variation, the plurality of particles comprise particles where the silicon core particles comprise SiNP, particles where the silicon core particles comprise SiMP and particles where the silicon core particles comprise SiOx. In another variation, the plurality of particles comprise particles where the silicon core particles are SiNP, particles where the silicon core particles are SiMP and particles where the silicon core particles are SiOx. In another variation, the plurality of particles comprise particles where the silicon core particles are SiNP and particles where the silicon core particles are SiOx. In yet another variation the plurality of particles comprise particles where the silicon core particles are SiMP and particles where the silicon core particles are SiOx.

In a further embodiment, the plurality of prelithiated silicon-containing particles comprise particles wherein the silicon core particles comprise SiNP and/or SiMP and particles wherein the silicon core particles comprise SiFe alloy or an SiFeMn alloy. In one variation, the plurality of particles comprise particles where the silicon core particles comprise SiNP, particles where the silicon core particles comprise SiMP and particles where the silicon core particles comprise SiFe. In one variation, the plurality of particles comprise particles where the silicon core particles comprise SiNP, particles where the silicon core particles comprise SiMP and particles where the silicon core particles comprise SiFeMn. In another variation, the plurality of particles comprise particles where the silicon core particles are SiNP, particles where the silicon core particles are SiMP and particles where the silicon core particles are SiFe. In another variation, the plurality of particles comprise particles where the silicon core particles are SiNP, particles where the silicon core particles are SiMP and particles where the silicon core particles are SiFeMn. In another variation, the plurality of particles comprise particles where the silicon core particles are SiNP and particles where the silicon core particles are SiFe. In another variation, the plurality of particles comprise particles where the silicon core particles are SiNP and particles where the silicon core particles are SiFeMn. In yet another variation the plurality of particles comprise particles where the silicon core particles are SiMP and particles where the silicon core particles are SiFe. In yet another variation the plurality of particles comprise particles where the silicon core particles are SiMP and particles where the silicon core particles are SiFeMn.

In another aspect, the presently disclosed subject matter provides a battery comprising: a negative electrode comprising the anode active material disclosed herein; a positive electrode; and an electrolyte.

In one variation of any embodiment or aspect disclosed herein, the lithium additive comprises one or more of the group consisting of $Li_2OO-SiO_2-TiO_2-P_2O_5$, LATP, LAGP, LLTO, LLZO, $Li_3N$, $LiBF_4$, $LiPO_4$, lithium-enriched variations thereof, and combinations thereof. In another variation of any embodiment or aspect disclosed herein, the lithium additive is a lithium-enriched additive comprising one or more of the group consisting of lithium-enriched $Li_2O-SiO_2-TiO_2-P_2O_5$, lithium-enriched LATP, lithium-enriched LAGP, lithium-enriched LLTO, lithium-enriched LLZO, lithium-enriched $Li_3N$, lithium-enriched $LiBF_4$, lithium-enriched $LiPO_4$, and combinations thereof. In another variation, the lithium additive comprises one or more of the group consisting of a lithium-enriched $Li_2O-SiO_2-TiO_2-P_2O_5$, a lithium-enriched LATP, a lithium-enriched LAGP, a lithium-enriched LLTO, and a lithium-enriched LLZO.

Silicon core particles used as disclosed herein generally have microstructural defects both on the surface and in the core in the form of cracks or voids. These defects can be generated or grown during the mechanical milling and both decrease the particle strength and lead to permanent consumption of lithium during formation of the SEI layer, leading to high irreversible capacity loss and poor cycling. In addition, the cracks can grow dramatically as a result of volume expansion stresses arising during cycling and these growths open up new surfaces, resulting in the increased consumption of additional lithium, and eventually leading to progressive capacity fading and poor cycle stability. The compositions and methods disclosed herein mitigate the effects of the crack defects or voids in the silicon-containing particles, for example, by prelithiating the silicon particles with a lithium additive, in some embodiments a lithium-enriched additive, thereby improving the electrochemical performance during long term cycling.

To synthesize the prelithiated silicon-containing materials, the starting materials were added to a bar milling apparatus, e.g. a steel jar and chrome steel media or a yttrium-stabilized zirconium jar and media, generally the media have an average size of around 10 mm diameter. The ball milling machine was run for between about 1 and about 12 hours at between about 600 RPM and about 900 RPM. Typically, the mass ratio of milling ball-to-powder materials was between about 10:1 and about 50:1. The particles formed from this preparation had an average size of between about 10 nm and about 5 µm, more typically between about 10 nm and about 1 µm. Alternately, the particles had an average size of between about 10 nm and about 2.5 µm.

Figure 1B:
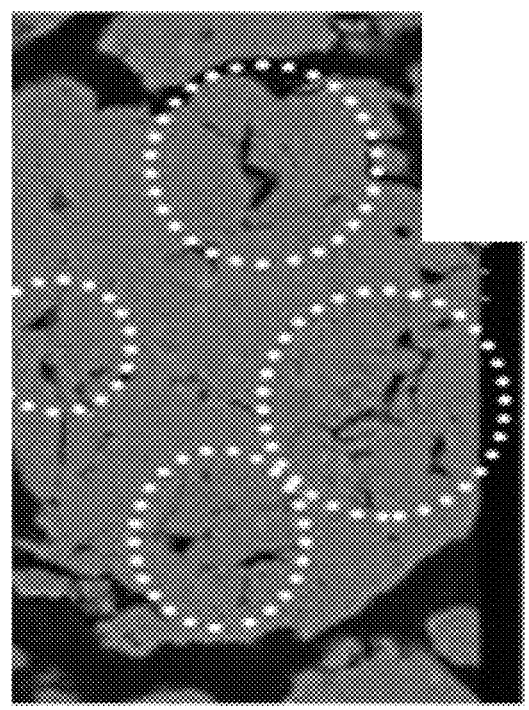
FIG. 1B is an image of surface defects (circled with dotted lines) in a silicon iron (SiFe) alloy particle.

Ball-milling the silicon-containing material yields a starting material that contains structural defects, such as cracks and/or voids, as shown for a Si—Fe—Mn alloy sample. See FIG. 1B. Prelithiation of the silicon-containing material can be performed by ball-milling a mixture of the silicon-containing material (e.g. Si/alloy) and the lithium based additive, e.g. LiSt, between about 0.1-25 wt. % of the silicon-containing material. Heat treatment can be added to the ball-milling process to facilitate coating by the lithium additive by inducing thermal diffusion, as shown with lithium stearate. The temperature of the heat treatment was typically maintained slightly above the melting point temperature of lithium additive to provide for diffusion of the additive into the void surfaces and crack defects of the silicon-containing particles, as well as to provide for coating of the silicon-containing particles.

Lithium stearate, LiSt, is inexpensive, readily available and its greasing ability contribute to the silicon-containing particles sliding rather than breaking during volume expansions. Additionally, LiSt has low melting point (around 220° C.), which provides for the low temperature process disclosed herein. Prelithiation with LiSt was typically performed by heat treatment of a reaction mixture comprising ground silicon-containing material and 5 wt. % LiSt at 300° C. for a 4 hour dwell time, which was adequate for diffusion of LiSt into and/or over the microstructural defects of the silicon-containing material.

The lithium additives, $Li_{2+x}O—SiO_2—TiO_2—P_2O_5$, LATP, LAGP, LLZO, LLTO, $Li_3N$, $LiBF_4$, and $Li_3PO_4$ are known to transport $Li^+$ ions and therefore can improve the particle-level ionic conductivity, in addition to mitigating the structural defects of the silicon-containing particles. As disclosed herein, silicon-containing particles prelithiated with these solid electrolytes were prepared via milling, e.g. LATP-coated silicon particles were typically prepared by ball milling a mixture of silicon-containing particles and LATP powder without any heat treatment.

Conveniently, the methods disclosed herein can be practiced without need for an inert atmosphere—the reactants can be exposed to either water or air without negative repercussions, thereby simplifying the manufacturing and use of the resulting anode materials.

As shown herein, the prelithiated silicon-containing particles, having defects filled and/or coated with a lithium additive, can be used as anode materials in, for example, lithium ion batteries. The particles disclosed herein are minimally affected by volume changes and don't appear to suffer significant structural damage during charge/discharge cycles. Accordingly, the unnecessary and unwanted formation of a thick SEI layer typically observed (without prelithiation) was avoided, and lithium loss was significantly reduced. Additionally, the material strength of the prelithiated silicon-containing particles is generally increased compared to unlithiated silicon-containing particles, resulting in improved physicochemical properties, and thus providing high capacity and enhanced electrochemical properties.

In some embodiments, the presently disclosed subject matter provides a component of an electrochemical cell comprising an anode active material comprising a prelithiated silicon-containing material as described hereinabove. For example, the cell component can comprise an anode comprising the prelithiated silicon-containing material.

The electrode can further comprise a current collector and/or one or more binders and/or conductive agents. The conductive agent can be used to enhance the electric conductivity of the anode active material, while the binder can be used to keep particles of the anode active material in sufficient contact with other particles of the anode active material and/or with the conductive agent(s). The binder can also be used to keep the other anode materials in contact with the surface of the electrode current collector. Examples of suitable conductive agents include, but are not limited to, carbon materials, such as carbon black, acetylene black, Ketjen black, carbon nanotubes, carbon nanofibers, mesoporous carbon, amorphous carbon, graphite (natural or artificial graphite), and mixtures thereof. Suitable binders include, but are not limited to, polymers such as polytetrafluoroethylene (PTFE), polyvinylidene fluoride (PVdF) and modified variations thereof. The binder can also be used in combination with water, carboxymethyl cellulose (CMC) or styrene butadiene rubber (SBR).

In some embodiments, the presently disclosed subject matter provides an electrochemical cell or a battery comprising an anode comprising the prelithiated silicon-containing material described hereinabove. In addition to the anode, the cell or battery can further comprise a positive electrode and an electrolyte disposed between the positive and negative electrodes. Any suitable positive electrode can be used. For example, the positive electrode can be any positive electrode typically used for non-aqueous electrolyte secondary batteries. In some embodiments, the positive electrode can include a positive electrode current collector formed from a metal foil (e.g., aluminium foil or other metal foil that is stable in a potential range of the positive electrode) or a similar material (e.g., a film having a surface layer formed of a metal stable in the potential range of the positive electrode) and a positive electrode active material layer formed on the positive electrode current collector.

The positive electrode can also include a binder, such as a fluorine-containing polymer (e.g., PTFE or PVdF), a rubber-based polymer, or the like. The binder can further be used in combination with a thickener (e.g., CMC or polyethylene oxide (PEO)). In some embodiments, the positive electrode can include a conductive material, such as the conductive agents described hereinabove for the negative electrode.

Any suitable electrolyte can be used. In some embodiments, the electrolyte is a non-aqueous electrolyte. The non-aqueous electrolyte can comprise a non-aqueous solvent and an electrolyte salt dissolved in the non-aqueous solvent. In addition to liquid electrolytes, the electrolyte can also be a solid electrolyte, comprising, for example, a gelled polymer.

As an electrolytic solution, for example, a non-aqueous (i.e., organic) electrolytic solution that contains a support electrolyte salt and an organic solvent can be used. The organic solvent is not particularly limited. Organic electrolytes can include cyclic ester carbonates, chain esters, carboxylic acid esters, cyclic ethers (e.g., crown ethers), chain ethers, nitriles, amides, halogen-substituted products, and mixtures thereof. For example, the organic electrolyte can include, but is not limited to, propylene carbonate (PC), ethylene carbonate (EC), vinylene carbonate, dimethyl carbonate (DMC), ethyl methyl carbonate (EMC), diethyl carbonate (DEC), fluoroethylene carbonate (FEC), methylpropyl carbonate, isopropiomethyl carbonate, ethyl propionate, methyl propionate, γ-butyrolactone (GBL), ethyl acetate, methyl acetate, tetrahydrofuran, 2-methyltetrahydrofuran, ethylene glycol dimethyl ether, ethylene glycol diethyl ether, acetonitrile (CAN), dimethyl sulfoxide (DMSO), diethoxyethane; dimethyl ether (DME), and tetraethylene glycol dimethyl ether (TEGDME).

Further, an ionic liquid can be used in or as an organic electrolytic solution. Suitable ionic liquids include, for example, but are not limited to, aliphatic quaternary ammonium salts such as N,N, N-trimethyl-N-propylammonium bis(trifluoromethanesulfonyl)amide (TMPA-TFSA], N-methyl-N-propylpiperidinium bis(trifluoromethanesulfonyl)amide (PP13-TFSA), N-methyl-N-propylpyrrolidinium bis(trifluoromethanesulfonyl)-amide (P13-TFSA), N-methyl-N-butylpyrrolidinum bis(trifluoromethanesulfonyl)-amide (P14-TFSA), and N,N-diethyl-N-methyl-N-(2-methoxyethyl)ammonium bis(trifluoromethane-sulfonyl)amide (DEME-TFSA); and alkyl imidazolium quaternary salts such as 1-methyl-3-ethyl imidazolium tetrafluoroborate (EMIBF$_4$), 1-methyl-3-ethyl imidazolium bis(trifluoromethanesulfonyl)amide (EMITFSA), 1-allyl-3-ethyl imidazolium bromide (AEImBr), 1-allyl-3-ethyl imidazolium tetrafluoroborate (AEImBF$_4$), 1-allyl-3-ethyl imidazolium bis(trifluoromethanesulfonyl)amide (AEImTFSA), 1,3-diallyl imidazolium bromide (AAImBr), 1,3-diallyl imidazolium tetrafluoroborate (AAImBF$_4$), and 1,3-diallyl imidazolium bis(trifluoro-methanesulfonyl)amide (AAImTFSA). In some embodiments, the organic electrolyte comprises ACN, DMSO, DME, PP13-TFSA, P13-TFSA, P14-TFSA, TMPA-TFSA and/or DEME-TFSA.

Electrolyte gels can be obtained by gelating the electrolytic solutions described above. For example, as a method of gelating a non-aqueous electrolytic solution, a polymer such as polyethylene oxide (PEO), polyacrylonitrile (PAN), polyvinylidene fluoride (PVdF) or polymethyl methacrylate (PMMA) can be added to a non-aqueous electrolyte solution. An electrolyte gel can be formed, for example, in such a manner that, after the polymer and the electrolytic solution, which were described above, are mixed, the mixture is coated by casting on a base material and dried, the dried mixture is peeled off the base material, and cut into pieces as required.

The non-aqueous electrolyte can further include an additive, for example, for forming a film on the positive and negative electrodes. Suitable additives include, but are not limited to, vinylene carbonate (VC), ethylene sulfite (ES), cyclohexylbenzene (CHB), and modified substances thereof.

In contrast to the lithium-containing additives used to coat the silicon core particles described herein, the following electrolyte salts and solid electrolyte are not lithium-enriched. The electrolyte salt can be, for example, a lithium salt typically used in non-aqueous electrolyte secondary batteries. Examples of such salts include, but are not limited to, LiPF$_6$, LiBF$_4$, LiAsF$_6$, LiClO$_4$, LiCF$_3$SO$_3$, LiN(FSO$_2$)$_2$, LiN(C$_l$F$_{2l+1}$SO$_2$)(CmF$_{2m+1}$SO$_2$) (l and m represent an integer of 1 or more), LiC(C$_p$F$_{2p+1}$ SO$_2$)(C$_q$F$_{2q+1}$SO$_2$)(C$_{2r+1}$SO$_2$) (p, q, and r represent an integer of 1 or more), Li[B(C$_2$O$_4$)$_2$], Li[B(C$_2$O$_4$)F$_2$], Li[P(C$_2$O$_4$)F$_4$] and Li[P(C$_2$O$_4$)$_2$F$_2$]. These lithium salts can be used alone or in combinations. Solid electrolytes can also include, for example, LISICON (i.e., lithium super ionic conductor) oxides represented by Li$_a$X$_b$Y$_c$P$_d$O$_e$ (wherein X represents at least one kind selected from the group of B, Al, Ga, In, C, Si, Ge, Sn, Sb and Se; Y represents at least one kind selected from the group of Ti, Zr, Ge, In, Ga, Sn and Al; and a to e satisfy relationships of 0.5<a<5.0, 0≤b<2.98, 0.5≤c<3.0, 0.02<d≤3.0, 2.0<b+d<4.0, and 3.0<e≤12.0); perovskite oxides such as Li$_x$La$_{1-x}$TiO$_3$; LISICON oxides such as Li$_4$XO$_4$—Li$_3$YO$_4$ (wherein X represents at least one kind selected from Si, Ge and Ti, and Y represents at least one kind selected from P, As and V) and Li$_3$DO$_3$—Li$_3$YO$_4$ (wherein D represents B, Y represents at least one kind selected from P, As and V); and garnet oxides of Li—La—Zr—O based oxides such as Li$_7$La$_3$Zr$_2$O$_{12}$ can be used. The solid electrolyte can be molded, for example, by rolling, or by preparing a slurry by mixing with a solvent, by coating, and by drying.

In some embodiments, the cell or battery can further comprise a separator. Suitable separators can include, porous materials having ion permeability and an insulating property. As the materials of the separator, for example, insulating resins, such as polyolefins including polyethylene (PE) and polypropylene (PP) as well as trilayers thereof, such as PP/PE/PP, and glasses can be used. Further, as a porous structure of the separator, for example, a mesh structure (or woven fabric) where structural fibers are regularly arranged, a nonwoven fabric structure where structural fibers are arranged at random, and a three-dimensional network structure having independent pores or coupling holes can be used.

Examples of materials for the current collectors with a silicon-based anode include, but are not limited to, metals, such as stainless steel, nickel, and copper; carbon materials, such as carbon fiber, carbon cloth, and carbon paper; and ceramic materials having high electron conductivity, such as titanium nitride.

In some embodiments, the electrodes and electrolyte (and separator, if used) can be included in a battery case, which can be prepared from any suitable material for keeping moisture away from the battery or cell components. In some embodiments, the battery case can serve as a current collector. The shape of the battery case is not particularly limited. For example, a coin shape, a flat plate shape, a cylindrical shape, a pouch shape, and a prismatic shape can be used. In some embodiments, the battery case is cylindrical and the battery components can have a jelly roll configuration (e.g., a configuration comprising layers of positive electrode, separator, negative electrode, and separator rolled into a single spool and further comprising the electrolyte).

The presently disclosed batteries can find use, for example, as batteries for vehicles, power tools, and in consumer electronics. For example, the batteries can be used in electric and hybrid cars; radio-controlled cars, trains, and aircraft; digital cameras; camcorders; smartphones and other mobile phones; laptop computers; tablet computers; flashlights; and the like.

EXAMPLES

The following Examples have been included to provide guidance to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing from the scope of the presently disclosed subject matter.

Example 1A

Prelithiated Silicon Carbon Coated Particles (60LATP-Si/C)

1. Preparation of Lithium-Enriched Additive: 60LATP

To synthesize Li$_{1.3+x}$Al$_{0.3}$Ti$_{1.7}$(PO$_4$)$_3$ (hereafter "60% Li excess LATP" or "60LATP," based on the ratios of the reaction mixture), Li$_2$CO$_3$, Al$_2$O$_3$, TiO$_2$, (NH$_4$)$_2$HPO$_4$ (each from Sigma-Aldrich, St. Louis, Mo., United States of America) were mixed in anhydrous ethanol in a stoichiometric ratio, with excess of 60 wt. % Li$_2$CO$_3$, compared with conventional Li$_{1.3}$Al$_{0.3}$Ti$_{1.7}$(PO$_4$)$_3$ (LATP). (As noted above, the amount of lithium incorporated into LATP was a fraction of the excess lithium added to the reaction mixture.) The reaction mixture was combined in a Mini PMV 0.4 L-Planetary mill machine (MSE Supplies, Tucson, Ariz., United States of America) with yttria-stabilized zirconia jar and media (10 mm diameter ball) and ball milled for 4 hours at 800 RPM. The slurry was spray dried using a Yamato GB-22 spray drier (Yamato Scientific Company, Tokyo, Japan) with inlet and outlet temperatures of 175° C. and 90° C. respectively. The powder was then calcined in an alumina crucible at 800° C. for 10 hours, after which the powder was ball milled for two hours at 800 RPM. The intermediate powder was then calcined in an alumina crucible at 800° C. for 10 hours, after which it was ball milled for two hours. The resulting product was sieved through a 500 mesh (25 μm) sieve to obtain the 60LATP powder.

2. Preparation of Silicon-Containing Material

Preparation of the silicon-containing material proceeded via three-step mechanical milling process. First, commercial Si (average particle size <40 μm, Elkem, Oslo, Norway) was ball-milled in a Mini PMV 0.4 L-Planetary mill machine (MSE Supplies, Tucson, Ariz., United States of America) with yttria-stablized zirconia jar and media (10 mm diameter) for 12 hours at 800 RPM to yield ball-milled Si powder.

3. Preparation of Pre-Lithiated Silicon-Containing Material

A 1:9 weight ratio (60LATP:Si powder) of 60LATP was added to the planetary mill and the mixture ball-milled for 2 hours at 800 RPM, yielding prelithiated Si powder.

4. Coating Pre-Lithiated Silicon-Containing Material with Carbon (60LATP-Si/C

Graphite powder (MTI Corporation, Richmond, Calif., United States of America) (in 5:95 ratio to prelithiated Si powder) was added to the planetary mill and the mixture was ball-milled for 1 hour at 800 RPM, yielding 60LATP-Si/C having a final size of 0.1-30 μm.

5. Electrode Fabrication

A material slurry for a negative electrode was prepared with 46 wt % 60LATP-Si/C (1-30 μm), 45 wt % natural graphite, 1 wt % Ketjen black (hereafter "KB," Lion Specialty Chemicals Co., Ltd., Tokyo, Japan) and 8 wt % water-based polyamide-Imide binder solution (hereafter "PAI," Aekyung Chemical Co., Ltd, Seoul, Korea comprising 14.8% binder and balance deionized water solution).

The slurry was cast on 15 μm thick battery grade Cu foil (MTI Corporation, Richmond, Calif., United States of America) using a doctor blade and a vacuum drawdown coater such that the loading per unit area of active material was substantially uniform at around 1.8-2.0 mg/cm². The laminate was first dried at atmospheric pressure and room temperature for 3 hours, then dried further at 110° C. under vacuum for 10 hrs.

A coin half cell 2032 was assembled in an argon environment glove box using Li metal (15.6 Dia×0.25 t mm) as a counter electrode with Celgard C480 as a separator, 1.0 M LiPF$_6$ with ethylene carbonate (EC)/diethyl carbonate (DEC)/fluoroethylene carbonate (FEC) 5/70/25 (v/v) (Starlyte from Panax Etec Co., Ltd., Busan, Korea) as the electrolyte and the cast, dried anode laminate from above. The half-cell assembly procedure was as follows: the anode electrode was placed on the bottom case of the coin cell, and 30 μL electrolyte was dropped on the electrode, a Celgard C480 separator was stacked on top of the wetted electrode, followed by a Li metal foil attached to a stainless-steel spacer. Finally, a wave spring was on the top, and the stack was covered with a top case.

After assembly, the coin cells were left to rest for 3 hours before the electrochemical tests described below.

6. Characterization of Lithium-Enriched Additive: 60LATP

The elemental composition analysis of 60LATP was analyzed using inductively coupled plasma spectroscopy (optical emission spectrometer, Varian 710-ES). The samples were completely dissolved in Aqua Regia (hydrochloric acid+nitric acid in 3:1 volume ratio). The results showed that 60LATP as synthesized contained 1.46 equivalents of lithium ($Li_{1.46}Al_{0.31}Ti_{1.39}(PO_4)_3$, generally ($Li_{1.3+x}Al_{0.3+y}Ti_{1.7-z}(PO_4)_3$ where $0 \leq x,y,z \leq 0.78$) compared to the theoretical stoichiometry of LATP having 1.3 equivalents of lithium ($Li_{1.3}Al_{0.3}Ti_{1.7}(PO_4)_3$).

7. Characterization of 60LATP-Si/C

Figure 2A:
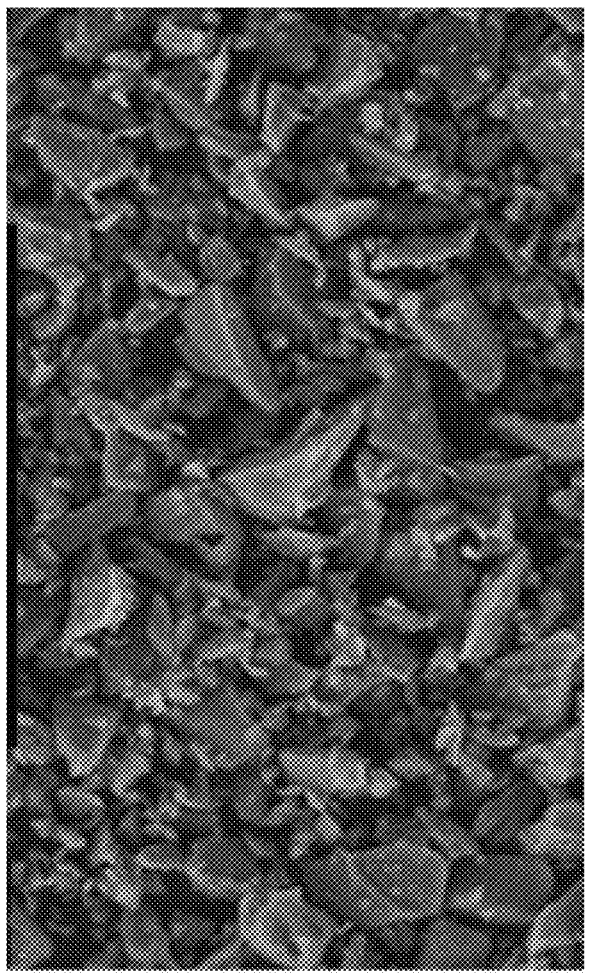
FIG. 2A is a scanning electron microscopy (SEM) image (at 5,000 times magnification) of commercially available microporous silicon powder.
Figure 2B:
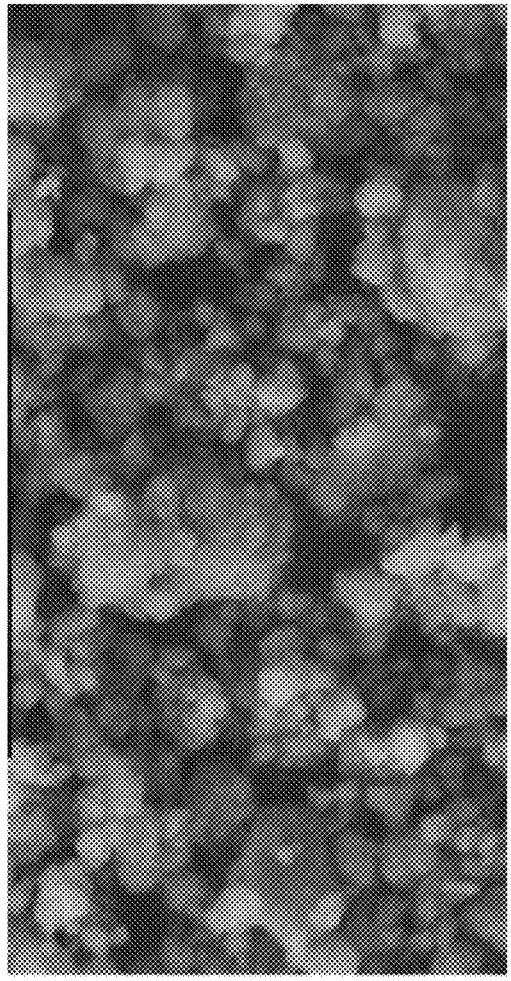
FIG. 2B is a scanning electron microscopy (SEM) image (at 20,000 times magnification) of a silicon nanoparticle lithiated with lithium enriched lithium aluminum titanium phosphate and coated with graphite (60LATP-Si/C).

Scanning electron microscopy (SEM) images of the components showed the microporous Si powder as-purchased (see FIG. 2A) and 60LATP-Si/C, prepared from processing the silicon powder and coating the ball-milled silicon particles with each of 60LATP and graphite. See FIG. 2B. The Si particles appeared flaky with sharp edges and had an average particle size of about 2 μm. 60LATP-Si/C showed more spherical product having an average particle size of about 100-200 nm.

8. Electrochemistry of 60LATP-Si/C

Figure 3:
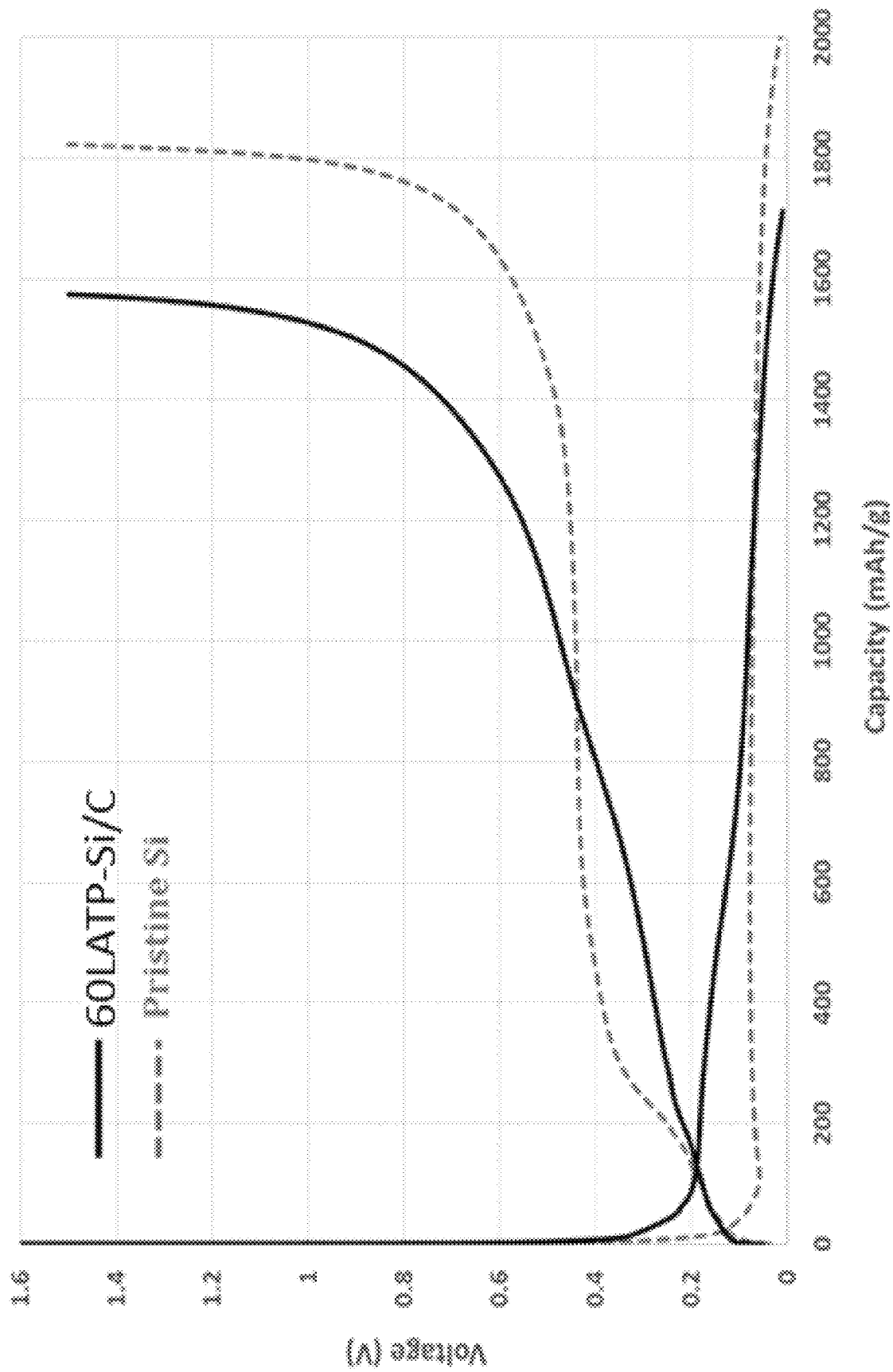
FIG. 3 is a graph of capacity (in milliampere-hours per gram (mAh/g)) versus voltage (V) for the charge-discharge profiles of half-cells prepared from a commercially available silicon powder (Pristine Si, dashed line) or a silicon nanoparticle prelithiated with lithium enriched lithium aluminum titanium phosphate and coated with graphite (60LATP-Si/C, solid line).

The manufactured cells were discharged (lithiated) and charged (delithiated) between 0.01 and 1.5V (versus Li/Li+). See FIG. 3. The initial charge capacity when tested at 0.1 C rate of as-purchased microporous Si is 1821.8 mAh/g with the columbic efficiency of 90.2%. The samples of 60LATP-Si/C showed a lower charge capacity (1574.1 mAh/g) but an improved columbic efficiency (91.9%). Without being bound by theory, the improved efficiency can be attributed to the compensation of lithium losses observed in the microporous Si upon prelithiation of the composition of the present application.

Figure 4:
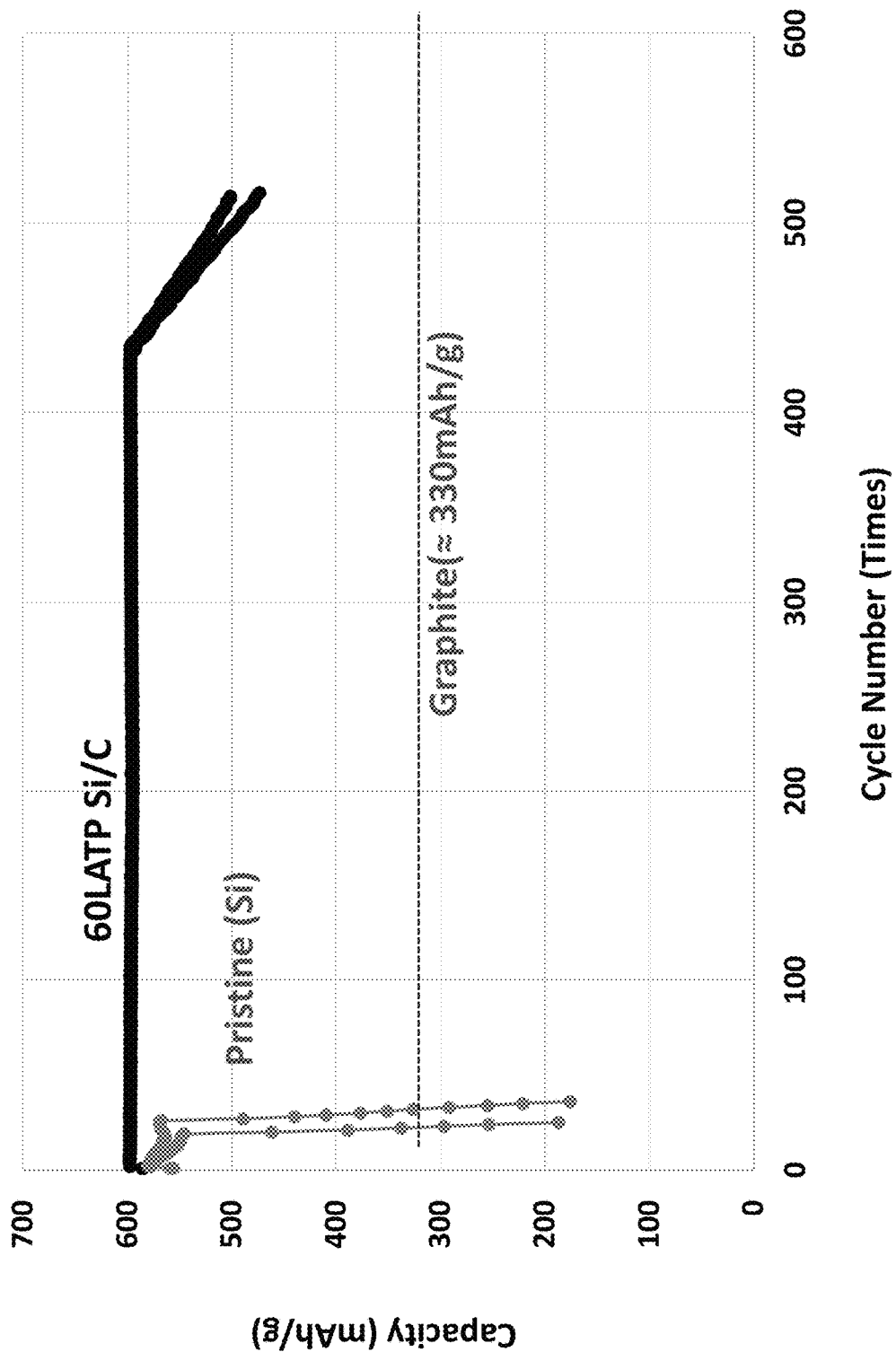
FIG. 4 is a graph of the cycling performance/discharge capacity of electrodes prepared from a commercially available microporous silicon powder (Pristine Si, grey lines with circles) or from a silicon nanoparticle prelithiated with lithium enriched lithium aluminum titanium phosphate and coated with graphite (60LATP-Si/C, solid lines).

The cycling performances of as-purchased microporous Si and 60LATP-Si/C samples were evaluated over 510 cycles at 1 C. See FIG. 4. The as-purchased microporous Si showed a delithiation charge capacity of 605.0 mAh/g in the initial cycle, which quickly faded to less than 200 mAh/g in the next 20-25 cycles. However, 60LATP-Si/C showed excellent cycle retention with capacity of 600 mAh/g over 430 cycles and only showed fading down to 80% (480 mAh/g) over 510 cycles.

Example 1B

Prelithiated Silicon Carbon Coated Particles (χ-LATP-SiFe/C)

Following the general methods outlined above, a series of χ-LATP-SiFe/C materials were prepared, where increasing amounts of excess lithium source were used to prepare lithium-enriched LATP, χ-LATP, where χ=0%, 30, 60, 90, 120.

1. Preparation of Lithium Additive: χ-LATP $Li_2CO_3$, $Al_2O_3$, $TiO_2$, $(NH_4)_2HPO_4$ (each purchased from Sigma-Aldrich Chemical Co. LLC) were mixed in anhydrous ethanol in a stoichiometric ratio, with excess of χ wt. % $Li_2CO_3$, compared with conventional $Li_{1.3}Al_{0.3}Ti_{1.7}(PO_4)_3$, based on starting material composition. Mini PMV 0.4 L-Planetary ball-mill machine (MSE Supplies, Tucson, Ariz.) with yttria-stabilized zirconia jar and media (10 mm diameter) were used to mechanically mix the precursor powders for 2 hours at 800 RPM. The obtained slurry was spray dried using a Yamato GB-22 spray drier with inlet and outlet temperatures of 175° C. and 90° C. respectively. The powder was calcined in an alumina crucible at 800° C. for 10 hours after which the contents were ball-milled for 2 hours at 800 rpm in a YSZ jar with YSZ ball media. The powder was again calcined and subjected to 2 hour ball-milling. The powder was sieved through a 500 mesh (25 μm) sieve to obtain the χ-LATP powder.

2. Preparation of Silicon-Containing Material (SiFe Alloy)

SiFe alloy was prepared as outlined above.

3. Preparation of Pre-Lithiated Silicon-Containing Material

SiFe alloy was prelithiated with each of χ-LATP according to the methods described above.

4. Coating Pre-Lithiated Silicon-Containing Material with Carbon

χ-LATP-SiFe was coated with graphite according to the methods described above.

5. Characterization of χ-LATP-SiFe/C

The anode material χ-LATP-SiFe/C was characterized and evaluated electrochemically as identified above.

TABLE 1

Physical details of the electrode samples and the first cycle columbic efficiency (0.1 C formation cycle).

| Sample Name | Delithiation Capacity (mAh/g) | Lithiation Capacity (mAh/g) | Columbic efficiency (%) |
| --- | --- | --- | --- |
| Si—Fe Alloy (no LATP) | 653.2 | 755.6 | 86.4% |
| LATP-SiFe/C | 615.7 | 731.2 | 84.2% |
| 30-LATP-SiFe/C | 634.5 | 733.8 | 86.5% |
| 60-LATP-SiFe/C | 670.3 | 738.6 | 90.8% |
| 90-LATP-SiFe/C | 630.6 | 730.9 | 86.3% |
| 120-LATP-SiFe/C | 637.2 | 732.6 | 87.0% |

The initial charge-discharge capacity and coulombic efficiency for each χ-LATP-SiFe/C are summarized in Table 1. In most cases, each prelithiated Si—Fe alloy showed an improvement in columbic efficiency compared to the unlithiated Si—Fe alloy, except for LATP-SiFe/C, which was prepared with LATP that had not been lithium-enriched. The Si—Fe alloy coated with LATP prepared with 60% excess Li (60-LATP-SiFe/C) showed the highest coulombic efficiency (90.8%) indicating its enhanced ability to reduce irreversible Li loss; that sample also exhibited the highest delithiation charge capacity (670.3 mAh/g).

Example 1C

Prelithiated Silicon Carbon Coated Particles (10LLZO-SiFe/C)

1. Preparation of Lithium Additive: 10LLZO

To synthesize $Li_{7+x}La_3Zr_2O_{12}$ (hereafter "10% Li excess LLZO" or "60LLZO," based on the ratios of the reaction mixture), LiOH, $La_2O_3$, $Al_2O_3$, $ZrO_2$, (each from Sigma-Aldrich, St. Louis, Mo., United States of America) were mixed in isopropyl alcohol in a stoichiometric ratio, with 0.2 mol % of $Al_2O_3$ replacing $ZrO_2$ and using 10 wt. % of excess Li(OH), compared with conventional $Li_7La_3Zr_2O_{12}$. (As noted above, the amount of lithium incorporated into LLZO was a fraction of the excess lithium added to the reaction mixture.) The reaction mixture was combined in a Mini PMV 0.4 L-Planetary mill machine (MSE Supplies, Tucson, Ariz., United States of America) with yttria-stabilized zirconia jar and media (10 mm diameter) and ball milled for 4 hours at 800 RPM. The slurry was spray dried using a Yamato GB-22 spray drier (Yamato Scientific Company, Tokyo, Japan) with inlet and outlet temperatures of 175° C. and 90° C. respectively. The powder was then calcined in an alumina crucible at 900° C. for 12 hours, with a 5° C./min ramp rate, after which the powder was ball milled in the presence of isopropyl alcohol for two hours at 800 RPM and the mixture then dried at 100° C. for 4 hours. The resulting product was sieved through a 500 mesh (25 μm) sieve to obtain the 10LLZO powder.

2. Preparation of Silicon-Containing Material (SiFe Alloy)

To synthesize the SiFe Alloy, ferrosilicon (Elkem Silicon Materials USA, Pittsburgh, Pa., United States of America; Si:Fe (75 wt %:25 wt %, or based on atomic percentages: Si:Fe 85.5 at %:14.5 at %)) was added to a steel jar and ball milled with chrome steel media (around 9.5 mm diameter) for 12 hours at 800 RPM using a Mini PMV 0.4 L-Planetary mill machine (MSE Supplies, Tucson, Ariz.). The mass ratio of milling ball-to-powder materials was 20:1.

3. Preparation of Pre-Lithiated Silicon-Containing Material

A 1:9 weight ratio (10LLZO:SiFe alloy) of 10LLZO was added to the planetary mill and the mixture ball-milled for 2 hours at 800 RPM, yielding prelithiated SiFe alloy, 10LLZO-SiFe.

4. Coating Pre-Lithiated Silicon-Containing Material with Carbon

The prelithiated SiFe alloy was collected and further ball milled with 3% SFG6 graphite (MTI Corporation, Richmond, Calif., United States of America) for 1 hour at 800 RPM, yielding 10LLZO-SiFe/C having a final size of 0.1-30 μm.

5. Characterization of 10LLZO-SiFe/C

The anode material 10LLZO-SiFe/C was characterized and evaluated electrochemically as identified above. While the cell prepared with un-prelithiated Si—Fe alloy showed a delithiation charge capacity of 649.6 mAh/g with a coulombic efficiency of 86.9%, 10LLZO-SiFe/C showed a 637.4 mAh/g delithitation charge capacity with a higher coulombic efficiency of 88.4%. The electrochemical cycling performance at a 1 C rate demonstrated that the un-prelithiated Si—Fe alloy exhibited capacity retention of 74% over 100 cycles and 10LLZO-SiFe/C demonstrated a capacity retention of 77.8%.

Example 2

Prelithiated Silicon Alloys

1. Preparation of Si/Alloy a. Preparation of SiFeMn Alloy

A commercial high-energy ball mill (ZOZ GmbH, Simoloyer®, ZOZ GmbH, Wenden, Germany) was used to mechanically alloy elemental powders of Si (99.99%), Fe (99.9%), and Mn (99.9%) in a stoichiometry of 80:18:2 weight (wt.) %, respectively, as the starting materials. The powders were loaded into the machine's hardened steel chamber with hardened steel balls of 4.7 mm diameter for milling. The milling cycle comprised (a) 45 sec at 12 μm $sec^{-1}$ (circumferential velocity), followed by (b) 15 sec at 8 μm $sec^{-1}$ for 12 hours and was fully carried out under super high purity argon atmosphere. The mass ratio of milling ball-to-powder materials was maintained as 20 to 1.

b. Preparation of SiFe Alloy

To synthesize the SiFe Alloy, ferrosilicon (Elkem Silicon Materials USA (Pittsburgh, Pa., United States of America): Si:Fe (75 wt %:25 wt %, or based on atomic percentages: Si:Fe 85.5 at %:14.5 at %)) was added to a steel jar and ball milled with chrome steel media (around 9.5 mm diameter) for 12 hours at 800 RPM using a Mini PMV 0.4 L-Planetary mill machine (MSE Supplies, Tucson, Ariz., United States of America). The mass ratio of milling ball-to-powder materials was 20:1. The resultant powder is collected and further ball milled with 3% SFG6 graphite for 1 hour at 800 RPM.

2. Prelithiation of Si/Alloy a. Prelithiation of SiFeMn Alloy

For the prelithiation of SiFeMn Alloy, 4.5 g of SiFeMn Alloy was hand milled with 0.25 g of lithium stearate (ChemCruz, Santa Cruz Biotechnology, Santa Cruz, Calif., United States of America) for 10 minutes using mortar and pestle. The mixture was then moved into a furnace, where the temperature profile was set to ramp from room temperature (22° C.) to a target of 300° C. at 5° C./minute rate, stay at 300° C. for 4 hours, and then return to room temperature. The mixture was then hand milled again for 10 minutes using mortar and pestle. These samples are identified herein as "Prelithiated SiFeMn Alloy_LiSt."

b. Prelithiation of SiFe Alloy

For the prelithiation of SiFe Alloy, the alloy was combined with 5 wt. % LATP in a Mini PMV 0.4 L-Planetary mill machine with yttria-stabilized zirconia jar and media (10 mm diameter) and ball milled for 3 hours at 800 RPM. The mass ratio of milling ball-to-powder materials was 20:1.

3. Characterization of Prelithiated Si/Alloy

Figure 2C:
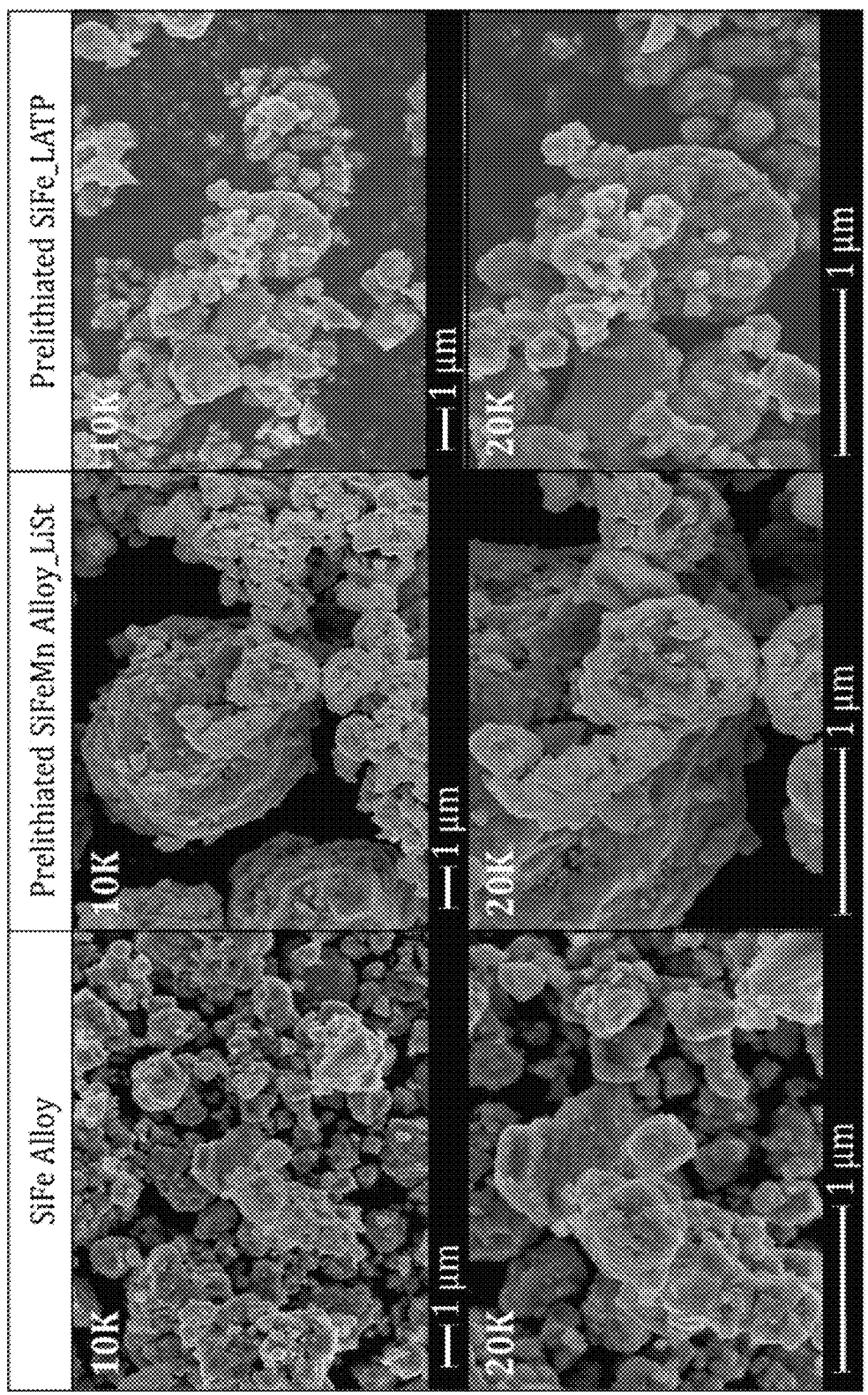
FIG. 2C is a series of scanning electron microscopy (SEM) images of silicon alloy materials and prelithiated silicon alloy materials. The images at the top are shown at 10,000 times (10K) magnification and the images at the bottom are shown at 20,000 times (20K) magnification. The two images at the left are of a silicon iron (SiFe) alloy. The two images in the middle are of a silicon iron manganese (SiFeMn) alloy prelithated with lithium stearate (LiSt). The two images on the right are of a SiFe alloy prelithated with lithium aluminum titanium phosphate (LATP). Each image includes, at the bottom left, a scale bar representing 1 micrometer (μm).

Scanning electron microscopy (SEM) images of the Prelithiated SiFe Alloy samples (see FIG. 2C) show that the material morphology essentially unchanged due to prelithiation. Fourier transform infrared spectroscopy (FTIR) spectra indicated the presence of lithium salts in the Prelithiated SiFe Alloy samples: the sample of Prelithiated SiFeMn Alloy_LiSt showed a $(COO)^-$ bond stretching at around $1554\ cm^{-1}$ (associated with lithium stearate) and Prelithiated SiFe Alloy_LATP showed a $(P-O)^-$ bond stretching at around $1206\ cm^{-1}$ (associated with LATP).

As disclosed herein, Prelithiated SiFeMn Alloy was characterized using Transmission electron microscopy (TEM), an X-ray diffraction (XRD) crystallinity study, a Brunauer-Emmett-Teller (BET) surface area and porosity analysis, and a Nanoindentation hardness test.

XRD Crystallinity Study:

To examine the crystallinity, X-ray diffraction (XRD) pattern was obtained on a Bruker D2 X-ray diffractometer using Cu k-alpha radiation with a scan rate of 0.02 degrees sec-1 from Bragg angle (2θ) of 10° to 80°.

FTIR Spectroscopy:

To explore the infrared absorption spectrum of the two samples, Fourier Transform Infrared (FTIR) spectroscopy was performed on Varian 670 FTIR spectrometer. The scan settings selected were, 8 cm-1 resolution with 70 scan numbers and 1.5 sensitivity.

BET Surface Area and Porosity Analysis:

Micromeritics ASAP-2020 (Nitrogen sorption at 77K) was used for surface area and porosity measurement. Si/Alloy and prelithiated Si/Alloy powder samples, 0.023 g in each case, were dried in vacuum oven at 80° C. for 4 hours to remove any absorbed residual moisture before they were used for BET analysis. Nitrogen adsorption isotherms measurement was carried out at a relative pressure range from 0.04-0.25 and using the following degassing method. First, evacuation at 50.0 mm Hg s-1 to 500 μm Hg, and hold for 60 minutes. Second, temperature ramp at 10.0° C./min to 200° C., and hold at 200° C. for 120 minutes.

Nanoindentation Hardness Test:

To obtain a comparative idea about the changes in materials strength Nanoindentation hardness test was performed using Hysitron TI 950 Triboindenter machine. The sample were mounted into epoxy for holding the powder particles in place during indentation. Standard Berkovich probe was used and 10 mN load function was applied with 5 sec load time, 2 sec hold time, and 5 sec unload time.

4. Active Material (Prelithiated Si/Alloy) Preparation

Prelithiated SiFeMn Alloy_LiSt as prepared herein was combined at 40 wt % with 42 wt % MC20 Synthetic Graphite (Mitsubishi Corp) and 18 wt % TIMCAL TIMREX® SFG6 graphite (Imerys, Quebec, Canada).

Prelithiated SiFe Alloy_LATP as prepared herein was combined at 40 wt % with 42 wt % MC20 Synthetic Graphite (Mitsubishi Corp) and 18 wt % TIMCAL TIMREX® SFG6 graphite (Imerys, Quebec, Canada).

5. Electrode Preparation (Prelithiated Si/Alloy)

A battery electrode slurry was prepared by first mixing 0.025 g of Ketjen Black (Lion Specialty Chemicals Co., Ltd., Tokyo, Japan) and 1.35 g of polyamide-Imide (Aekyung Chemical Co., Ltd, Seoul, Korea) binder solution (14.8% binder and balance deionized water solution) in 2.6 g of deionized water for 4 hours using magnetic stirrer at 100 RPM on a hot plate at 25° C. The prelithiated Si/Alloy active material (0.945 g) prepared according to the process described above was mixed in the KB-PAI binder solution slurry using an IKA T10 homogenizer (Sigma Aldrich, St. Louis, Mo., United States of America) at 5000 RPM for 5 minutes. Artificial graphite (1.33 g, prepared from 0.93 g MC20 and 0.4 g SFG6) was then added to the slurry solution with mixing performed at 5000 RPM for 10 minutes. A final mixing was performed at 5000 RPM for 5 minutes to achieve a homogenous electrode slurry. The overall solid content used was 40%. The resultant slurry was poured onto a Cu-foil and a doctor-blade was run at optimum speed with thickness adjusted to get a final active material loading of 2 mg $cm^{-2}$. The electrodes were at 80° C. for 10 hours and then moved into an argon environment Glove box 6. Cell Assembly The prepared electrodes were punched into 14 mm discs and used to make CR2032 Chinese coin cells. In the coin cells assembly, Li metal (15.6 Dia×0.25 t mm) was used as counter electrode with Celgard 2500 as separator. For electrolyte, 60 μl of 1M $LiPF_6$ in ethylene carbonate (EC)/diethyl carbonate (DEC)/fluoroethylene carbonate (FEC)—5/70/25 (v/v) was used. After assembly, the coin cells were left to rest in the Glove box for 20 hours of activation before the electrochemical tests described below.

Electrochemical Properties of Prelithiated Si/Alloy

To evaluate the electrochemical properties of Prelithiated Si/Alloy, CR2032 coin cells were loaded at around 2 mg/$cm^2$ with each of SiFe Alloy, SiFeMn Alloy, Prelithiated SiFe Alloy_LATP, and Prelithiated SiFeMn Alloy_LiSt consistent with the preparation described above and the tests were run at 0.1 C (0.19 mA current) formation in the first cycle and tested for 0.5 C (0.97 mA current) for the remaining 200 cycles.

Properties of SiFe Alloy were comparable to properties of SiFeMn Alloy and analyses of these two samples were comparable, unless SiFeMn Alloy is specifically noted.

Figure 5:
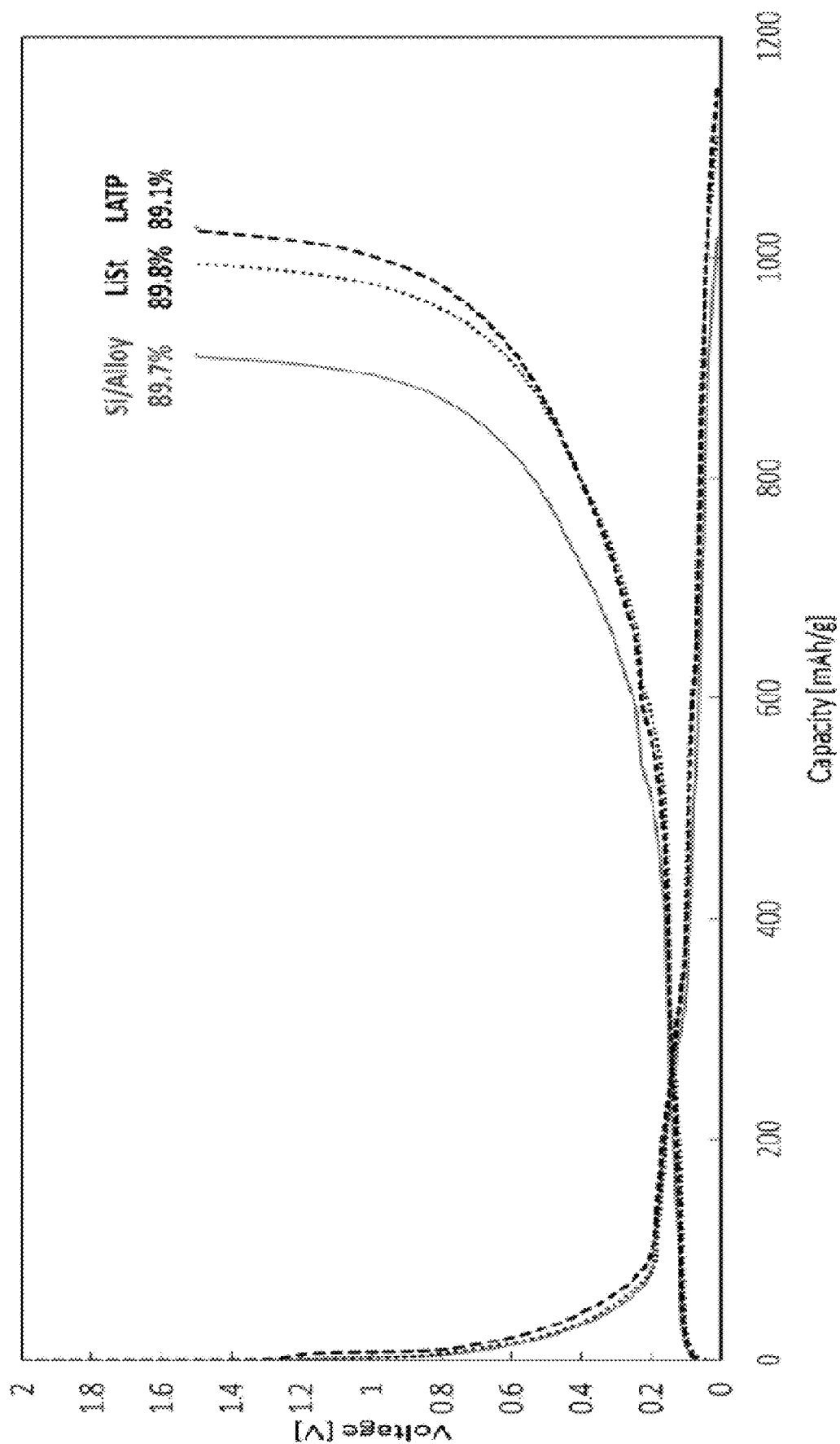
FIG. 5 is a graph of capacity (in milliampere-hours per gram (mAh/g)) versus voltage (V) for the formation cycle at a 0.1 coulomb (C) rate (0.19 milliampere (mA) current) of a silicon iron alloy (SiFe alloy, solid lines), a silicon iron manganese alloy prelithiated with lithium stearate (Prelithiated SiFeMn Alloy_LiSt, dotted lines) or a silicon iron alloy prelithiated with lithium aluminum titanium phosphate (Prelithiated SiFe Alloy_LATP, dashed lines).

Prelithiated SiFe Alloy_LATP, and Prelithiated SiFeMn Alloy_LiSt showed improved electrochemical properties compared to SiFe Alloy, specifically the first cycle columbic efficiency. As shown in Table 2, below, the initial delithiation charge capacity of SiFe Alloy was 912.4 mAh/g with the columbic efficiency of 89.7%. See also FIG. 5. The two prelithiated Si/Alloy samples showed similar columbic efficiency, but higher initial delithiation charge capacity. See Table 2. Without being bound to any one theory, the increased capacity of prelithiated SiFeMn Alloy_LiSt can be attributed to an improvement in the physicochemical properties, e.g. surface area and particle strength (see below), and the effective compensation of Li loss at the crack defects due to the prelithiation. Likewise, in case of Prelithiated SiFe Alloy_LATP, the increased capacity can be attributed to the effective compensation of Li loss and the improvement in the overall ionic conductivity.

TABLE 2

Physical details of the electrode samples and the first cycle columbic efficiency (0.1 C formation cycle).

| Sample Name | Electrode Thickness (μm) | Loading (mg/cm²) | Density (g/cm³) | Delithiation Carge Capacity (mAh/g) | Lithiation Discharge Capacity (mAh/g) | Efficiency (%) |
|---|---|---|---|---|---|---|
| SiFe Alloy | 54 | 1.99 | ~0.47 | 912.4 | 1017.7 | 89.7 |
| Prelithiated SiFeMn Alloy_LiSt | 54 | 2.03 | ~0.48 | 997.9 | 1111.8 | 89.8 |
| Prelithiated SiFe Alloy_LATP | 65 | 2.25 | ~0.54 | 1027.5 | 1153.7 | 89.1 |

X-ray powder diffraction (XRD) patterns of SiFeMn Alloy and Prelithiated SiFeMn Alloy_LiSt overlap with significant peaks showing at 2θ=17.29°, 28.89°, 37.76°, 45.910, 48.18°, 49.110, 55.64°, and 70.23°, which are generally consistent with the Fe—Si alloy and Si phase. The peak at 2θ=45.91° was believed to be associated with Mn based alloy phase. Prelithiation was believed to fill the crack pores of Si/Alloy and the surface area was expected to decrease. To confirm this Brunauer-Emmett-Teller (BET) surface area and porosity measurement analysis was performed. Based on the nitrogen adsorption-desorption curves for the two samples, the surface area for Prelithiated SiFeMn Alloy_LiSt (4.30 μm²/g) was less than that of SiFeMn Alloy (5.29 μm²/g). Likewise, the pore volume vs pore size plot is in good agreement. The SiFeMn Alloy has pore volume and pore size of around 0.021 cm³/g and 15 nm, respectively, and for Prelithiated SiFeMn Alloy_LiSt the corresponding values are 0.015 cm³/g and 14.79 nm. A nanoindenter was used for the hardness test of the powder samples mounted in epoxy; the indentation load was applied using Berkovich probe. After prelithiation, the hardness (H) of SiFeMn Alloy increased from 0.07 GPa to 0.08 GPa, and the reduced modulus (Er) increased from 7.11 GPa to 8.43 GPa in Prelithiated SiFeMn Alloy_LiSt.

Figure 6:
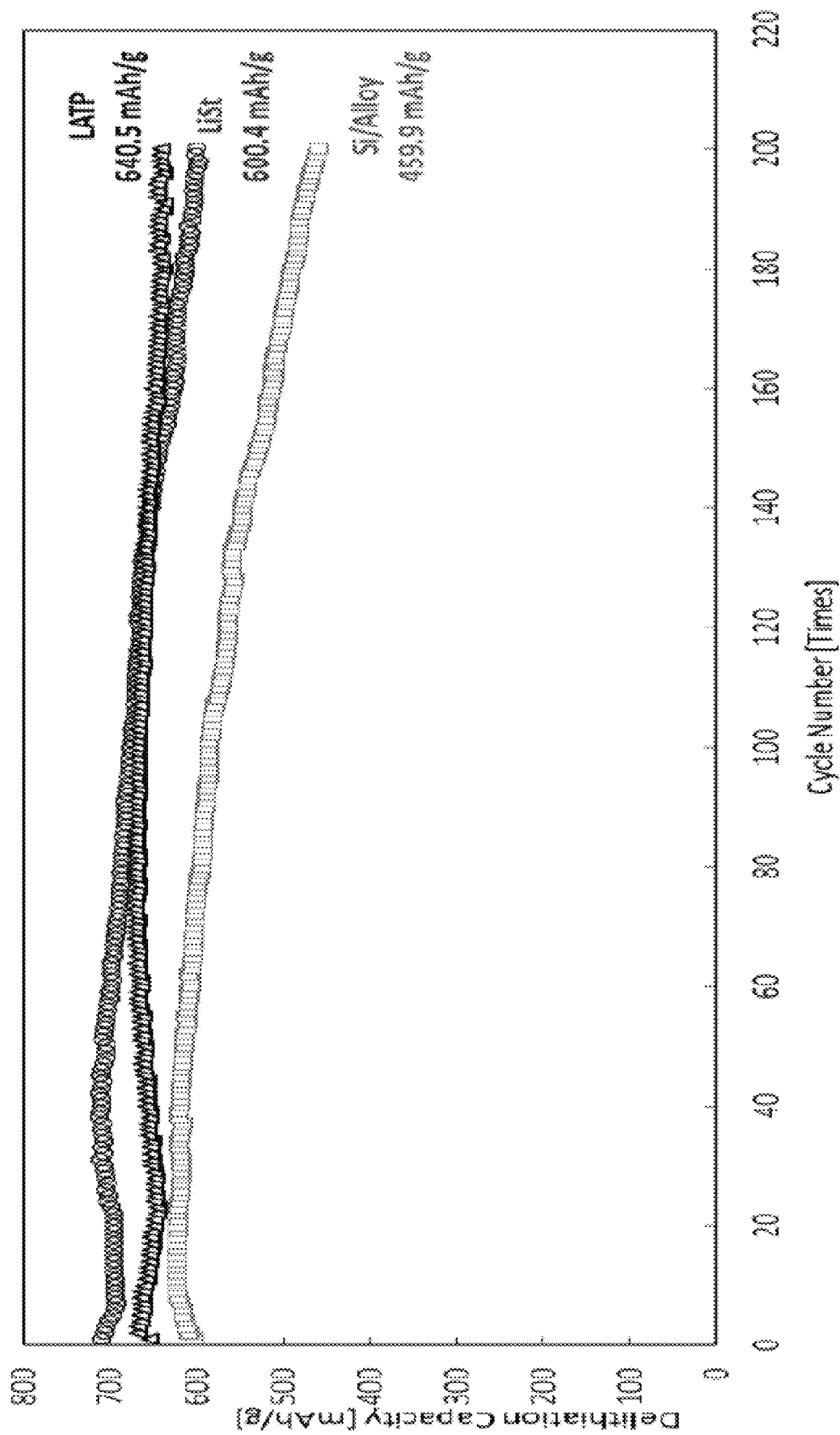
FIG. 6 is a graph of delithiation capacity (in milliampere-hours per gram (mAh/g) versus number of cycles over 200 cycles at 0.5 coulomb (C) (0.97 milliampere (mA) current) for each of a silicon iron alloy (SiFe Alloy, squares), a silicon iron manganese alloy prelithiated with lithium stearate (Prelithiated SiFeMn Alloy_LiSt, circles), and a silicon iron alloy prelithiated with lithium aluminum titanium phosphate (Prelithiated SiFe Alloy_LATP, triangles).

Testing the delithiation cycling capacity over 200 cycles showed significant capacity loss for SiFe Alloy compared to Prelithiated SiFeMn Alloy_LiSt or Prelithiated SiFe Alloy_LATP. Cycling performance of the SiFe Alloy and prelithiated SiFe Alloy samples over 200 cycles at 0.5 C rate was measured (see FIG. 6) and the cycling details are listed in Table 3.

TABLE 3

Delithiation cycling capacity retention over 200 cycles at 0.5 C (0.97 mA current).

| Sample Name | Delithiation Capacity - 1st Cycle (mAh/g) | Delithiation Capacity - 200th Cycle (mAh/g) | Delithiation Capacity Retention (%) |
|---|---|---|---|
| SiFe Alloy | 605.0 | 459.9 | 76.0 |
| Prelithiated SiFeMn Alloy_LiSt | 710.7 | 600.4 | 84.5 |
| Prelithiated SiFe Alloy_LATP | 654.8 | 640.5 | 97.8 |

Figure 7:
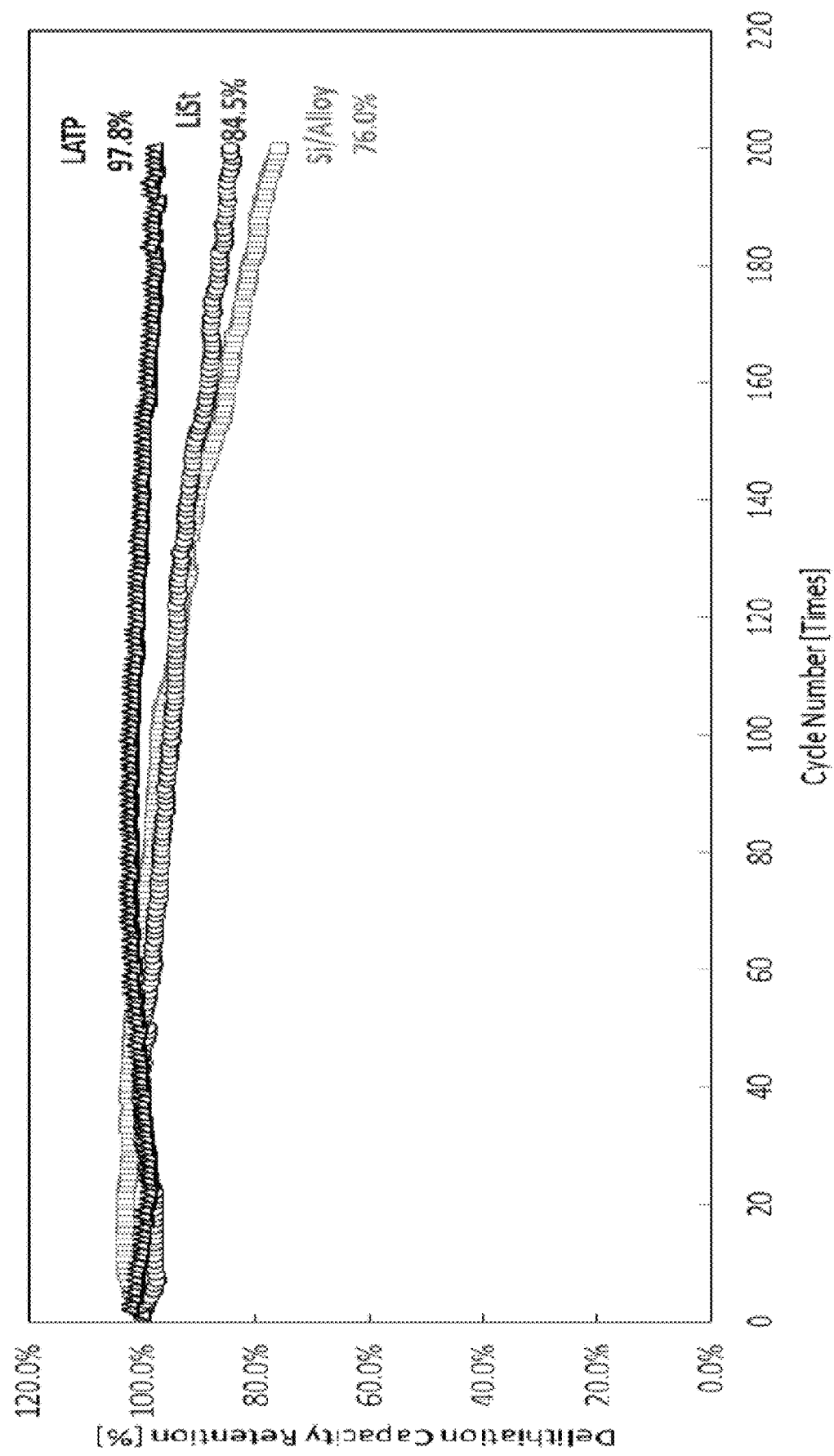
FIG. 7 is a graph of delithiation capacity retention (in percentage (%)) versus number of cycles over 200 cycles at 0.5 coulomb (C) (0.97 milliampere (mA) current) for each of a silicon iron alloy (SiFe Alloy, squares), a silicon iron manganese alloy prelithiated with lithium stearate (Prelithiated SiFeMn Alloy_LiSt, circles), and a silicon iron alloy prelithiated with lithium aluminum titanium phosphate (Prelithiated SiFe Alloy_LATP, triangles).

For a better understanding of the significant capacity loss in SiFe Alloy when compared to the prelithiated SiFe Alloy samples, capacity retention was measured. See FIG. 7. The SiFe Alloy showed a delithiation charge capacity of 605.0 mAh/g in the initial cycle, which faded to 459.9 mAh/g at 200th cycle. Prelithiated SiFe Alloy samples showed a comparatively higher capacity in the initial cycle and showed enhanced cycle performance. Prelithiated SiFeMn Alloy_LiSt samples started at 710.7 mAh/g, which faded to a capacity of 561.02 mAh/g after 200 cycles with a capacity retention of 84.5%. Prelithiated SiFe Alloy_LATP showed a capacity of 654.8 mAh/g initially, which faded to only 640.5 mAh/g after 200 cycles, demonstrating the highest capacity retention of 97.8%.

Figure 8:
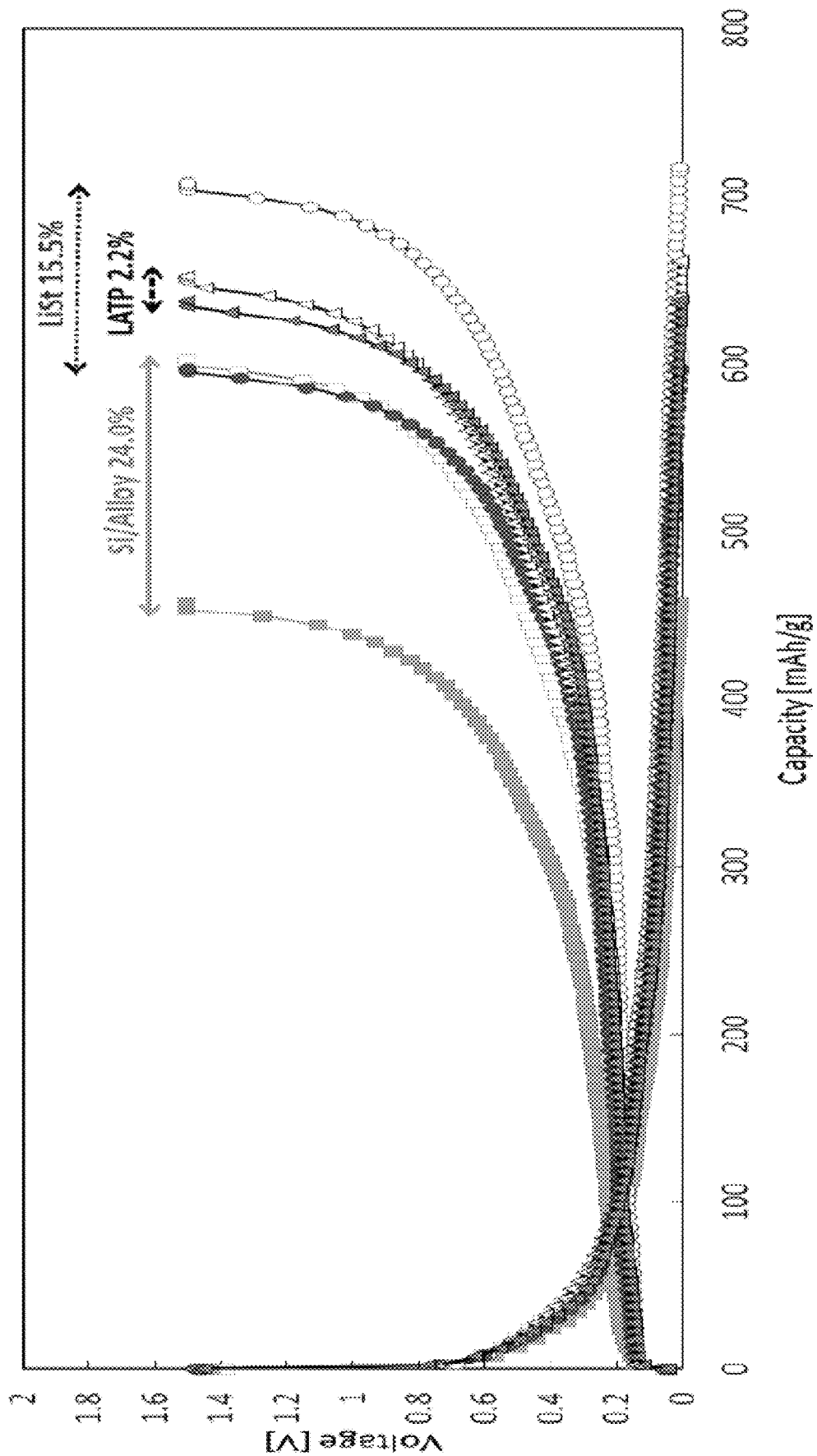
FIG. 8 is a graph of voltage (V) versus capacity (in milliampere-hours per gram (mA/g)) over 200 cycles at 0.5 coulomb (C) (0.97 milliampere (mA) current) for each of a silicon iron alloy (SiFe Alloy), a silicon iron manganese alloy prelithiated with lithium stearate (Prelithiated SiFeMn Alloy_LiSt), and a silicon iron alloy prelithiated with lithium aluminum titanium phosphate (Prelithiated SiFe Alloy_LATP). Data for the SiFe Alloy for the first cycle is shown in unfilled squares, while that from the $200^{th}$ cycle is shown in filled squares. Data for the Prelithiated SiFeMn Alloy for the first cycle is shown in unfilled circles, while data from the $200^{th}$ cycle is shown in filled circles. Data for the Prelithated SiFe alloy for the first cycle is shown in unfilled triangles, while data from the $200^{th}$ cycle is shown in filled triangles.

FIG. 8 shows the voltage profiles over 200 cycles indicating the extent of capacity fading in SiFe Alloy sample and the enhancement in performance delivered by prelithiating the SiFe Alloy. The increase in capacity of the prelithiated samples is attributed to pre-feeding a lithium additive and therefore providing compensation for the expected Li loss. The enhanced cycle performance of the Prelithiated SiFe Alloy is attributed to the improved particle strength due to prelithiation and also to the improved ionic transport conductivity of Prelithiated SiFe Alloy_LATP sample. The SiFe Alloy samples showed stable cycling behavior up to 100 cycles, but in later cycles started to fade progressively, which is attributed at least in part to the mechanical crack defects and poor particle strength. The prelithiated samples demonstrated improved cycle performance even after 100 cycles, indicating that the prelithiated SiFe Alloy electrodes were less affected by volume stresses, and showed enhanced cycling behavior up to 200 cycles.

As shown herein, prelithiation is a simple yet effective method to further raise the bars of the high-energy Si/Alloy. The prelithiation process comprises simple milling of Si/Alloy with a lithium based additive with a low temperature heat treatment as appropriate and does not require inert or complex vacuum systems. Prelithiation helps to compensate for expected Li losses, avoids unnecessary capacity drains, and improves the volume expansion tolerance, as demonstrated from long term cycling data.

A variety of lithium salts can be used in the presently disclosed subject matter. As exemplified herein, lithium stearate is readily available and has a low melting point. LATP can improve the ionic transport properties, as well as compensate for some capacity loss. Prelithiation does not alter the crystal structure of the Si/Alloy; it reduces the surface area susceptible to parasitic SEI formations, and increases particle strength and hardness, thereby improving the material's physicochemical properties. Prelithiated Si/Alloy demonstrated improved electrochemical performance with high capacity, great cycle stability, enhanced cycle retention and less capacity fading at significantly high loading (~2 mg/cm²) and over 200 cycles.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A prelithiated silicon-containing material comprising:
   (a) a silicon core particle comprising a silicon-containing material selected from the group consisting of:
      (i) a silicon alloy, wherein the silicon alloy is selected from the group consisting of a silicon iron (SiFe) alloy and an alloy comprising silicon, iron and another element X, wherein X is selected from the group consisting of Mn, Cr, Sn, Ti, Ni, Co, Mo, Zr, Cu, and Al;
      (ii) nanoparticulate silicon (SiNP) and/or microparticulate silicon (SiMP); and
      (iii) a silicon suboxide ($SiO_x$); and
   (b) a lithium coating layer comprising a lithium additive, wherein the lithium coating layer directly covers at least a portion of the silicon core particle, further comprising a carbon coating layer coating at least a portion of an outer surface of the lithium coating layer, wherein the carbon coating layer comprises a carbon-containing material.

2. The prelithiated silicon-containing material of claim 1, wherein the carbon-containing material is selected from the group consisting of activated carbon, artificial graphite, natural graphite, carbon nanotubes, graphene, and combinations thereof.

3. The prelithiated silicon-containing material of claim 1, wherein the silicon core particle comprises SiNP and/or SiMP.

4. The prelithiated silicon-containing material of claim 3, wherein the lithium additive is a lithium-enriched additive comprising one or more of the group consisting of lithium-enriched $Li_2O$—$SiO_2$—$TiO_2$—$P_2O_5$, lithium-enriched LATP, lithium-enriched LAGP, lithium-enriched LLTO, lithium-enriched LLZO, lithium-enriched $Li_3N$, lithium-enriched $LiBF_4$, lithium-enriched $LiPO_4$, and combinations thereof.

5. The prelithiated silicon-containing material of claim 4, wherein the lithium additive comprises one or more of the group consisting of a lithium-enriched $Li_2O$—$SiO_2$—$TiO_2$—$P_2O_5$, a lithium-enriched LATP, a lithium-enriched LAGP, a lithium-enriched LLTO, and a lithium-enriched LLZO.

6. The prelithiated silicon-containing material of claim 1, wherein the silicon core particle comprises a silicon alloy selected from the group consisting of a SiFe alloy and an alloy comprising silicon, iron and another element X, wherein X is selected from the group consisting of Mn, Cr, Sn, Ti, Ni, Co, Mo, Zr, Cu, and Al.

7. The prelithiated silicon of claim 6, wherein the silicon alloy is selected from the group consisting of a silicon iron (SiFe) alloy and an alloy comprising silicon, iron and another element X, wherein X is selected from the group consisting of Mn, Cr, Ni, Co, Zr, and Al.

8. The prelithiated silicon of claim 7, wherein the silicon alloy is a silicon iron (SiFe) alloy or an alloy comprising silicon, iron and manganese (Mn).

9. The prelithiated silicon-containing material of claim 6, wherein the lithium additive is a lithium-enriched additive comprising one or more of the group consisting of lithium-enriched $Li_2O$—$SiO_2$—$TiO_2$—$P_2O_5$, lithium-enriched LATP, lithium-enriched LAGP, lithium-enriched LLTO, lithium-enriched LLZO, lithium-enriched $Li_3N$, lithium-enriched $LiBF_4$, lithium-enriched $LiPO_4$, and combinations thereof.

10. The prelithiated silicon-containing material of claim 9, wherein the lithium additive comprises one or more of the group consisting of a lithium-enriched $Li_2O$—$SiO_2$—$TiO_2$—$P_2O_5$, a lithium-enriched LATP, a lithium-enriched LAGP, a lithium-enriched LLTO, and a lithium-enriched LLZO.

11. The prelithiated silicon-containing material of claim 1, wherein the lithium additive is a lithium-enriched additive comprising one or more of the group consisting of lithium-enriched $Li_2O$—$SiO_2$—$TiO_2$—$P_2O_5$, lithium-enriched LATP, lithium-enriched LAGP, lithium-enriched LLTO, lithium-enriched LLZO, lithium-enriched $Li_3N$, lithium-enriched $LiBF_4$, lithium-enriched $LiPO_4$, and combinations thereof.

12. The prelithiated silicon-containing material of claim 11, wherein the lithium additive comprises one or more of the group consisting of a lithium-enriched $Li_2O$—$SiO_2$—$TiO_2$—$P_2O_5$, a lithium-enriched LATP, a lithium-enriched LAGP, a lithium-enriched LLTO, and a lithium-enriched LLZO.

13. The prelithiated silicon-containing material of claim 1, wherein the lithium additive comprises one or more of the group consisting of lithium stearate (LiSt), lithium oxide-silicon oxide-titanium oxide-phosphorus pentoxide ($Li_2O$—$SiO_2$—$TiO_2$—$P_2O_5$), lithium aluminum titanium phosphate (LATP), lithium aluminum germanium phosphate (LAGP), lithium lanthanum titanium oxide (LLTO), lithium lanthanum zirconium oxide (LLZO), lithium nitride ($Li_3N$), lithium tetrafluoroborate ($LiBF_4$), lithium carbonate ($Li_2CO_3$), lithium phosphate ($Li_3PO_4$), lithium-enriched variations thereof, and combinations thereof.

14. A process for the preparation of a prelithiated silicon-containing material, wherein the process comprises:
   providing a silicon core particle comprising a silicon-containing material selected from the group consisting of: (i) a silicon alloy, wherein the silicon alloy is selected from the group consisting of a silicon iron (SiFe) alloy and an alloy comprising silicon, iron and another element X, wherein X is selected from the group consisting of Mn, Cr, Sn, Ti, Ni, Co, Mo, Zr, Cu, and Al; (ii) nanoparticulate silicon (SiNP) and/or microparticulate silicon (SiMP); and (iii) a silicon suboxide ($SiO_x$);
   milling the silicon core particle with one or more lithium additive, such that a lithium coating layer comprising the one or more lithium additive directly covers at a least a portion of the silicon core particle; and
   milling the lithium-coated particle with a carbon-containing material, such that a carbon coating layer coats at least a portion of an outer surface of the lithium coating layer, wherein the carbon coating layer comprises the carbon-containing material.

15. The process of claim 14, wherein the lithium additive is a lithium-enriched additive comprising one or more of the group consisting of lithium-enriched $Li_2O$—$SiO_2$—$TiO_2$—$P_2O_5$, lithium-enriched LATP, lithium-enriched LAGP, lithium-enriched LLTO, lithium-enriched LLZO, lithium-enriched $Li_3N$, lithium-enriched $LiBF_4$, lithium-enriched $LiPO_4$, and combinations thereof.

16. The process of claim 14, wherein the one or more lithium additive is selected from the group consisting of lithium stearate (LiSt), lithium oxide-silicon oxide-titanium oxide-phosphorus pentoxide ($Li_2O$—$SiO_2$—$TiO_2$—$P_2O_5$), lithium aluminum titanium phosphate (LATP), lithium aluminum germanium phosphate (LAGP), lithium lanthanum titanium oxide (LLTO), lithium lanthanum zirconium oxide (LLZO), lithium nitride ($Li_3N$), lithium tetrafluoroborate ($LiBF_4$), lithium carbonate ($Li_2CO_3$), lithium phosphate ($Li_3PO_4$), lithium-enriched variations thereof, and combinations thereof to provide a lithium-coated particle.

17. An anode active material comprising a plurality of prelithiated silicon-containing particles, which individually can be the same or different, wherein each of the plurality of prelithiated silicon-containing particles comprises:
(a) a silicon core particle comprising a silicon-containing material selected from the group consisting of:
(i) a silicon alloy, wherein the silicon alloy is selected from the group consisting of a silicon iron (SiFe) alloy and an alloy comprising silicon, iron and another element X, wherein X is selected from the group consisting of Mn, Cr, Sn, Ti, Ni, Co, Mo, Zr, Cu, and Al;
(ii) nanoparticulate silicon (SiNP) and/or microparticulate silicon (SiMP); and
(iii) a silicon suboxide ($SiO_x$); and
(b) a lithium coating layer comprising a lithium additive, wherein the lithium coating layer directly covers a least a portion of the silicon core particle;
wherein one or more of the plurality of prelithiated silicon-containing particles further comprises (c) a carbon coating layer coating at least a portion of an outer surface of the lithium coating layer, wherein the carbon coating layer comprises a carbon-containing material.

18. The anode active material of claim 17, wherein one or more of the plurality of prelithiated silicon-containing particles comprises a silicon core particle comprising SiNP and/or SiMP.

19. The anode active material of claim 17, wherein one or more of the plurality of prelithiated silicon-containing particles comprises a silicon core particle comprising a silicon alloy selected from a SiFe alloy or an alloy comprising silicon, iron, and another element X, wherein X is selected from the group consisting of Mn, Cr, Sn, Ti, Ni, Co, Mo, Zr, Cu, and Al.

20. The anode active material of claim 19, wherein the silicon alloy is selected from the group consisting of a silicon iron (SiFe) alloy and an alloy comprising silicon, iron and another element X, wherein X is selected from the group consisting of Mn, Cr, Ni, Co, Zr, and Al.

21. The anode active material of claim 17, wherein the plurality of prelithiated silicon-containing particles comprise particles wherein the silicon core particles comprise SiNP and/or SiMP and particles wherein the silicon core particles comprise SiOx.

22. The anode active material of claim 17, wherein the plurality of prelithiated silicon-containing particles comprise particles wherein the silicon core particles comprise SiNP and/or SiMP and particles wherein the silicon core particles comprise a SiFe alloy or an SiFeMn alloy.

23. The anode active material of claim 17, wherein the lithium additive is a lithium-enriched additive comprising one or more of the group consisting of lithium-enriched $Li_2O$—$SiO_2$—$TiO_2$—$P_2O_5$, lithium-enriched LATP, lithium-enriched LAGP, lithium-enriched LLTO, lithium-enriched LLZO, lithium-enriched $Li_3N$, lithium-enriched $LiBF_4$, lithium-enriched $LiPO_4$, and combinations thereof.

24. The anode active material of claim 23, wherein the lithium additive is one or more of the group consisting of a lithium enriched $Li_2O$—$SiO_2$—$TiO_2$—$P_2O_5$, a lithium-enriched LATP, a lithium-enriched LAGP, a lithium-enriched LLTO, a lithium-enriched LLZO, and combinations thereof.

25. A battery comprising:
a negative electrode comprising the anode active material of claim 17;
a positive electrode; and
an electrolyte.

26. The battery of claim 25, wherein the lithium additive is a lithium-enriched additive comprising one or more of the group consisting of lithium-enriched $Li_2O$—$SiO_2$—$TiO_2$—$P_2O_5$, lithium-enriched LATP, lithium-enriched LAGP, lithium-enriched LLTO, lithium-enriched LLZO, lithium-enriched $Li_3N$, lithium-enriched $LiBF_4$, lithium-enriched $LiPO_4$, and combinations thereof.

27. The battery of claim 26, wherein the lithium additive is one or more of the group consisting of a lithium enriched $Li_2O$—$SiO_2$—$TiO_2$—$P_2O_5$, a lithium-enriched LATP, a lithium-enriched LAGP, a lithium-enriched LLTO, a lithium-enriched LLZO, and combinations thereof.

28. The anode active material of claim 17, wherein the lithium additive comprises one or more of the group consisting of lithium stearate (LiSt), lithium oxide-silicon oxide-titanium oxide-phosphorus pentoxide ($Li_2O$—$SiO_2$—$TiO_2$—$P_2O_5$), lithium aluminum titanium phosphate (LATP), lithium aluminum germanium phosphate (LAGP), lithium lanthanum titanium oxide (LLTO), lithium lanthanum zirconium oxide (LLZO), lithium nitride ($Li_3N$), lithium tetrafluoroborate ($LiBF_4$), lithium carbonate ($Li_2CO_3$), lithium phosphate $Li_3PO_4$, lithium-enriched variations thereof, and combinations thereof.

29. The anode active material of claim 17, wherein the carbon coating layer comprises a carbon-containing material selected from the group consisting of activated carbon, artificial graphite, natural graphite, carbon nanotubes, graphene, and combinations thereof.

* * * * *